(12) United States Patent
Kuijpers et al.

(10) Patent No.: US 8,528,470 B2
(45) Date of Patent: Sep. 10, 2013

(54) ADDING AN ADDITIVE TO A PRODUCT SUITABLE FOR HUMAN CONSUMPTION

(75) Inventors: Andries Johan Martijn Kuijpers, Westerbeek (NL); Maurice Eduardus Theodorus van Esbroeck, Bemmel (NL); Adrianus Josephes van den Nieuwelaar, Gemert (NL)

(73) Assignee: Stork PMT B.V., Boxmeer (NL)

( * ) Notice: Subject to any disclaimer, the term of this patent is extended or adjusted under 35 U.S.C. 154(b) by 595 days.

(21) Appl. No.: 12/777,121

(22) Filed: May 10, 2010

(65) Prior Publication Data

US 2010/0218717 A1 Sep. 2, 2010

Related U.S. Application Data

(62) Division of application No. 11/587,146, filed as application No. PCT/NL2005/000270 on Apr. 8, 2005, now abandoned.

(30) Foreign Application Priority Data

Apr. 21, 2004 (NL) .................................. 1025995

(51) Int. Cl.
| | | |
|---|---|---|
| A23L 1/315 | (2006.01) | |
| A23L 1/314 | (2006.01) | |
| B05B 5/025 | (2006.01) | |
| B05C 5/00 | (2006.01) | |

(52) U.S. Cl.
USPC ................... 99/494; 99/358; 99/516; 118/13; 118/24; 118/30

(58) Field of Classification Search
USPC ......... 99/516, 532; 118/13, 24, 30; 426/235, 426/236
See application file for complete search history.

(56) References Cited

U.S. PATENT DOCUMENTS

| | | | |
|---|---|---|---|
| 3,457,080 A | | 7/1969 | Watkins |
| 3,468,691 A | * | 9/1969 | Watkins ........................ 426/239 |
| 5,353,994 A | * | 10/1994 | Clark ............................ 239/700 |
| 5,385,086 A | * | 1/1995 | Burns et al. ..................... 99/451 |
| 2002/0034565 A1 | | 3/2002 | Theodorus Van Esbroeck et al. |
| 2003/0065414 A1 | | 4/2003 | Van Den Nieuwelaar et al. |

FOREIGN PATENT DOCUMENTS

| | | |
|---|---|---|
| DE | 1454204 | 3/1969 |
| EP | 0560509 | 9/1993 |
| EP | 0819381 | 1/1998 |
| GB | 1319064 | 5/1973 |
| GB | 2286515 | 8/1995 |
| JP | 2002000218 | 1/2002 |
| WO | WO 93/02573 | 2/1993 |
| WO | WO 00/32051 | 6/2000 |

\* cited by examiner

*Primary Examiner* — Reginald L Alexander

(74) *Attorney, Agent, or Firm* — Birch, Stewart, Kolasch & Birch, LLP

(57) ABSTRACT

A method for treating a product suitable for human consumption, for example, a meat product, such as slaughtered poultry or parts thereof, in which a large number of products are successively supplied, optionally in groups, to an inspection station in which each product is subjected to a visual inspection to detect a defect on the respective product. If a decision is made to provide a specific additive-addition treatment to a product, the product is supplied to an additive-addition station, where the product is subjected to an additive-addition treatment and an additive is added to at least one part of the outside of each product or the inside of each product.

20 Claims, 37 Drawing Sheets

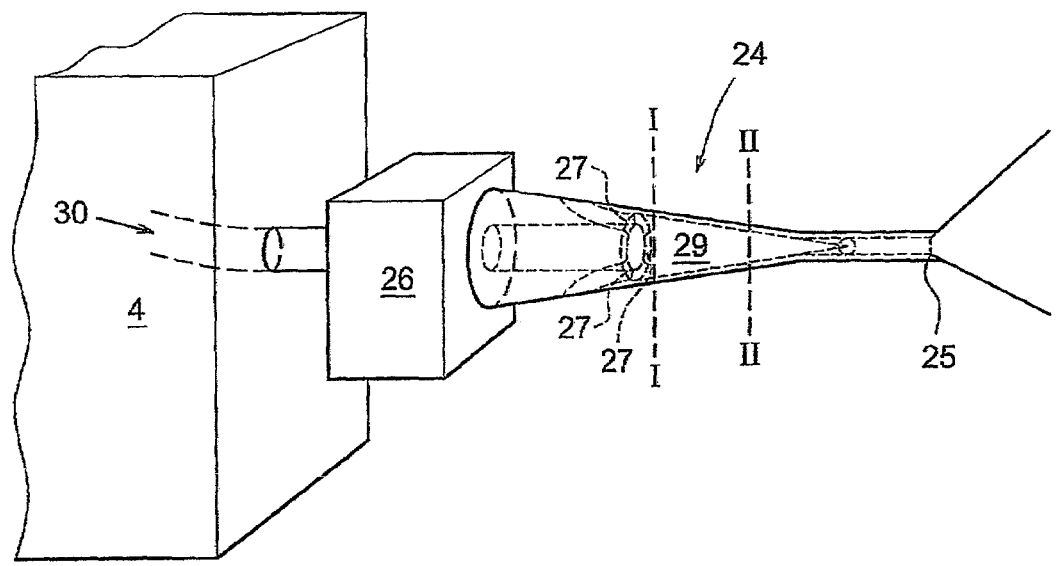
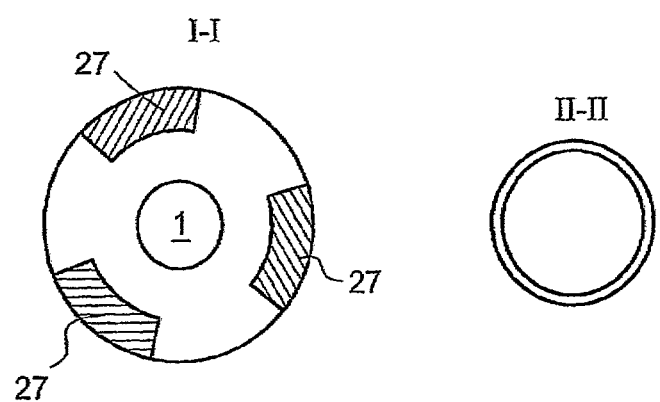
FIG. 12

ADDING AN ADDITIVE TO A PRODUCT SUITABLE FOR HUMAN CONSUMPTION

This application is a Divisional of co-pending application Ser. No. 11/587,146, filed Oct. 20, 2006, and for which priority is claimed under 35 U.S.C. §120. Application Ser. No. 11/587,146 is a National Stage application of PCT International Application No. PCT/NL2005/000270, filed Apr. 8, 2005, which designates the United States, and on which priority is claimed under 35 U.S.C. §120. This application also claims priority under 35 U.S.C. §119(a) on U.S. Pat. No. 1,025,995, filed in the Netherlands on Apr. 21, 2004. The entire contents of each of the above documents are hereby incorporated by reference.

A first aspect of the invention relates to the treatment of a product suitable for human consumption, in particular a meat product, such as for example slaughtered poultry or parts thereof, in which treatment an additive is added to at least one part of the product.

From the prior art, installations for slaughtering and processing poultry are known, in which a large number of birds to be slaughtered are placed in a slaughter line and subsequently killed and divided into parts.

It is known to provide these installations with an inspection station where each bird, prior to being divided into parts, is subjected to a visual inspection. Some inspection systems in this case view a bird in its entirety and, based on this inspection, determine a quality grade for the bird, on the basis of which a decision is made regarding how to proceed with the bird. More refined inspection systems are already capable of inspecting partial areas of the bird and to assign a quality grade to every partial area. Thus, it is known to detect discolourations, damaged skin and other defects.

With slaughtering installations known from the prior art, parts of the birds with specific visually detectable defects are ejected. These parts of the birds are then often marinated in a batch process, usually in a tumbler, so that the marinade makes the defects less visible.

Currently, however, there is an increasing demand for marinated poultry products, so that it is no longer appropriate to treat marinated products as a "stream of residue". It is particularly desirable to optimize the production method further in order to be able to meet the demand, supply the desired quality and, of course, make the cost price attractive.

It is an object of the present invention to propose an improved method and associated equipment to this end.

The first aspect of the invention provides a method for treating a product suitable for human consumption, in particular a meat product, such as for example slaughtered poultry or parts thereof, in which method:

a large number of products are successively supplied, optionally in groups, to an inspection station; and each product is subjected to an inspection in the inspection station, preferably a visual inspection, in such a manner that, for example, a visually detectable defect on the respective product is detected.

This method is characterized in that:

subsequently, on the basis of the visual inspection, a decision is made as to whether the respective product should be subjected to an additive-addition treatment, which products to be subjected to an additive-addition treatment are successively supplied to an additive-addition station, where the products are successively subjected to an additive-addition treatment and an additive is added to at least one part of the outside of each product or the inside each product.

In other words, the invention provides that a determination is made, based on the inspection of a specific product, as to whether that specific product should be subjected to a specific additive-addition treatment, instead of more or less rejecting the product and ejecting all rejected products and subsequently, if appropriate, choosing an additive-addition treatment for the batch of ejected products. In this case, it is possible to determine, both on the basis of a visual inspection of the product and on the basis of another parameter, such as weight or magnitude, whether the respective product should be subjected to a specific additive-addition treatment. It is, for example, possible to treat only chicken parts of a desired size, for example of equal size, size below a specific maximum or size above a specific minimum. The weight may be determined by weighing. The magnitude may be determined by means of, for example, the same visual inspection means, for example by determining the surface area of the product on a screen or photograph.

The first aspect of the invention furthermore provides that no "batch" products are produced for subjecting to an additive-addition treatment, but that products are successively supplied to an additive-addition station and are treated successively. In addition, a stream of products which have been successively treated with additive is thus obtained, which is advantageous for downstream installations, such as for example a packaging installation.

As mentioned above, known slaughtering installations for poultry are already provided with inspection stations comprising inspection equipment, usually a camera with associated image-processing means, so that the method is advantageously brought about by providing the known slaughtering installation with an additive-addition station. Moreover, slaughtering installations are often provided with weighing installations for determining the weight of the product.

In one possible embodiment, a visual check of the additive coating is carried out in a checking station after the additive has been applied. In this case, it is for example possible to check whether a visual defect has been sufficiently hidden from view by the additive or whether to reject the product and/or to repeat the additive coating.

The weight may also be used as a check measure in the checking station. If the weight of the untreated product has been determined earlier, for example during a first selection of products which are subjected to an additive-addition treatment, for example in the inspection station, the checking station can then determine whether the treated product has increased sufficiently in weight, that is to say, whether sufficient additive material has been added.

With the embodiments according to the invention, such as for example with a device comprising heating means or a device for electrostatically adding additive particles, it is conceivable that only the weight is determined in the inspection station and no further visual inspection takes place. It can then be decided on the basis of this weight whether the respective product should be subjected to the additive-addition treatment. In one embodiment, a checking station may be arranged downstream in order to determine the weight of the product again and on the basis thereof it can then be decided whether sufficient additive has been added.

With an alternative method, the decision whether a product should be subjected to a specific additive-addition treatment is taken on the basis of the weight of the respective product determined in an inspection station. A visual check of the additive coating is subsequently carried out in a checking station.

Thus, for example, weighing is carried out in the inspection station by means of a first weighing apparatus. The weight can be determined again in the checking station using a second weighing apparatus, following which the difference can be calculated. It is also possible to carry out a differential weighing operation using a differential weighing apparatus. In addition, it is possible to integrate a weighing device with the carrier. Preferably, the device according to the invention is provided with recycling means, so that if it is found, during the visual check and/or the weight check, that insufficient additive has been applied to the product, the product can be recycled to the additive-addition device.

Preferably, the checking station is designed to carry out various visual checks, the visual check of a specific product being adapted to the previous visual inspection of the respective product prior to the application of the additive.

By way of example, if a visually detectable defect was found at a certain location on the product during the previous visual inspection, in particular the additive application in said location would be checked during the check.

The expression various visual checks can thus, inter alia, be understood to mean a check directed at a specific location and/or a check directed at a specific defect which was detected earlier. In the latter case, it is conceivable to adapt the check to the fact that a blue discolouration or a red discolouration were detected earlier on a (part of a) poultry.

In one embodiment which is advantageous in practice, provision is made for the products to be conveyed past an inspection station by means of a first conveyor which is provided with a separate carrier for the product or group of products, a second conveyor being associated with the additive-addition station, with a separate carrier for each product or group of products, a transfer station being provided between the first and second conveyor, memory means being used furthermore in such a manner that the result of the visual inspection carried out in the inspection station of every product carried on the second conveyor is known.

The embodiment described above makes it possible to add an additive-addition line with its own conveyor to an existing slaughter installation, the transfer station (suitable embodiments of which are well known in the field) effecting the transfer of a (part of a) poultry to the additive-addition line. In this case, the information obtained during the earlier inspection for every product introduced into the additive-addition line remains known, so that it can be used during the execution and optimization of the additive addition.

In a slaughtering installation, the poultry is usually subjected to one or more dividing operations, in which a product is divided into parts. The additive treatment may involve each of those parts, but preferably specific parts, such as for example the fillets, legs and the like, are treated.

In one advantageous embodiment, which has already being used in slaughtering installations, the visual inspection takes place before the one or more dividing operations.

In one advantageous embodiment, the additive-addition device is designed to carry out various additive-addition treatments, the treatment of a specific product being adapted to the previous visual inspection of the respective product, possibly in combination with data relating to the weight of the product.

For example, the amount of additive to be applied may vary and the amount of additive to be applied to a specific product is adapted to the previous visual inspection of the respective product. Another example which may be mentioned is that the location of the application of the additive of a product may vary, the additive to be applied to a specific product being directed at one or more specific locations which are chosen on the basis of the prior visual inspection of the respective product.

In one advantageous embodiment, the additive-addition station is fitted with an addition device, which addition device dispenses additive at a distance from the product, which additive moves towards the product through the air and at least partially lands on the product.

Preferably, provision has been made in this case for additive which has not landed on the product to be collected and returned to the addition device.

In one possible embodiment, the returned additive is subjected to a reprocessing treatment before the additive is dispensed again.

A second aspect of the present invention relates to a method and device for adding marinade on or into a product suitable for human consumption, in particular a meat product, such as for example slaughtered poultry or parts thereof.

From the prior art, various ways for adding a marinade on or into a product suitable for human consumption are known. WO 00/32051 describes various methods for applying marinade by spraying, which in practice does not always lead to satisfactory results.

It is an object of the second aspect of the present invention to provide an alternative method for adding marinade.

With the method according to the second aspect of the invention, the marinade is heated prior to being added. As a result of being heated, the marinade is easier to process and other marinade compositions are easier to process than has been the case hitherto.

The second aspect of the invention also provides a device which comprises heating means and application means for the marinade. The marinade is in this case first passed along the heating means and subsequently to the application means along a preferably heated path. Preferably between 0.5 and 4% by weight as a percentage of the product weight is added as marinade.

According to a first embodiment, the heating means comprise a melting device. A melting device can turn solid marinade into liquid marinade. Advantageously, marinade can be supplied to the heating means which is delivered in a solid state. This may be, for example, mixtures of spices and fats, which have been compressed to form solid bars or blocks, or which are delivered in the form of powders. The marinade may also be mixed with a liquid substance, such as for example oil, before being supplied to heating means. It is possible that parts of the marinade which are in a solid state do not melt; in that case, it is important that the mass as a whole is viscous.

In one embodiment of the invention, the marinade is heated or melted by bringing it into contact with a heated wall. This wall is heated with the aid of, for example, water. Advantageously, the marinade is advanced along the wall, so that the marinade reaches the temperature of the wall and maintains it. In the case of melting marinades, it is important that the temperature of the marinade to be processed is between the melting temperature and the degradation temperature. When the marinade cools down, for example because it is too far from the heated wall, solidification may occur as a result of which it is no longer possible to process the marinade. Excessive temperatures should also be avoided as ingredients of the marinade could then decompose or degrade. This is particularly important when frictional heat is created as well.

Advantageously, the advancing means create chambers in which the marinade moves along one or more heated walls as a result of which marinade can be discharged in batches. An advantage of these chambers is that the powder does not have to be dosed exactly beforehand. The advancing means may, for example, consist of a rotor. Preferably, the speed of the advancing means is adjustable, so that the mass to be melted per unit time and the desired temperature can be adjusted. Preferably, the distance between the advancing means and the heated wall is adjustable, so that the marinade preferably melts in a thin layer, without too much frictional heat being created or particles becoming lodged between the wall and the advancing means. Preferably, the distance is between 0.5 and 2.0 millimeters, depending on the marinade.

In another embodiment, the marinade may be heated by bringing the marinade into contact with a heated gas. This gas may also serve as an aid for processing the marinade further, for example when it is sprayed on.

Advantageously, the volume of marinade in the entire device, in particular downstream of the heating location, is small, such as for example the abovementioned chambers, so that the loss of marinade when the addition process is stopped, is also small. For example, the time during which the heated marinade is in the device from melting to addition is at most 20 minutes.

In one embodiment, the entire path along which the heated marinade moves to the addition means, is heated. This may be, for example, lines, hoses, connecting pieces and the like. The hoses may be, for example, electrically heated hoses. Preferably, as few connecting pieces as possible are used, so that when the addition of marinade is stopped, problems involving solidifying marinade are prevented. Preferably, all transitions in the path are gradual, thus preventing solid parts of the marinade from staying behind. More preferably, the path is designed such that when the process is stopped, the path automatically empties to a large degree, thus preventing sagging of the hoses.

Advantageously, a (for example electrically) heated buffer store is present between the heating means and the addition means, in which buffer store the molten marinade can be stored and to which excess marinade can be returned. The latter will be discussed in more detail below. The contents of the buffer store are preferably small, for example between 100 ml and 5 liters. Preferably, agitation means are present in the buffer store, in order to contribute to the temperature of the marinade remaining between the melting temperature and the decomposition temperature. Preferably, the flow rate of the buffer store can be adjusted, so that the supply of marinade to the addition means can be controlled.

Advantageously, a pump is placed between the heating means and the application means in order to advance the liquid marinade. This pump is preferably a hose pump.

Preferably, the addition means are heated.

In one embodiment of the invention, the addition means for adding the heated marinade are injection means. This method is advantageous if, for example, it is desired that the marinade has an effect on the flavour, but it is not desired that the appearance of the product changes much.

In another embodiment, the addition of the marinade is effected through applying the marinade to a distributing element, such as for example, a brush or a sponge-like medium. The distributing element is brought into contact with the product in order in this way to transfer the marinade.

In one advantageous embodiment, the addition of the marinade is effected by means of a spraying process. The spraying means comprise at least one opening, which is preferably located in a spraying head. The diameter of the spraying opening is preferably between 1-15 millimeters, particularly preferably between 5 and 10 millimeters. With an opening with such dimensions, it is also possible to spray relatively large ingredients which are not meltable. In this context, consideration may be given to capsicum particles, pepper particles, etc. The spraying head may be arranged so as to be stationary or movable.

Advantageously, the marinade is sprayed with the aid of pressurized gas, for example air. Mixing of the gas and the marinade may take place in a mixing chamber inside the spraying head, but also outside the spraying opening. Advantageously, the gas is heated in order to prevent the marinade from solidifying before it reaches the product.

Advantageously, the addition means for adding the heated marinade are used in a device for processing large quantities of products. Preferably, the addition of marinade takes place in a continuous process. In one preferred embodiment, the products are conveyed past the addition means successively in groups or individually by means of conveying means. In one variant, the products are cooled prior to the application of marinade.

When the application means are in the form of, for example, a spraying device, it is advantageous to arrange screening means between the product and a part of the conveying means so that at least a part of the conveying means is screened off during the application process. When the conveying means are, for example, carriers, a seal can be fitted on the narrowest part of the carrier. More advantageously, screening means may also be provided behind the product, viewed from the direction of addition, or around the product and the spraying means. This prevents the components of the marinade from spreading in the surroundings (air, carriers, other surfaces). In one embodiment, such a screened-off (but not sealed-off) space may be heated in order to control the solidification process of the marinade applied to the product.

Advantageously, the screening means are heated so that the marinade which lands on it remains warm and liquid. As a result, the marinade can be removed and/or run off and be collected, for example into a collecting unit placed under the screening means.

Advantageously, the marinade which has landed on the screening means is recycled, so that the marinade can be re-used. This may be effected, for example, by collecting the marinade and allowing it to solidify so that it can be resupplied to the device later. It is also possible to recycle the still liquid collected marinade to a buffer store which has been placed between the melting unit and the addition means. Advantageously, this recycled marinade is filtered in order to prevent parts which impede the progress of the process, for example feathers, fibres or pieces which have come off the product, from falling into the marinade to be added.

In one advantageous embodiment, the device according to the invention comprises an air extraction installation in order to prevent pollution of the surroundings and accumulation of marinade in the installation. This air extraction installation may be fitted with an air-purification installation such as one or more filters for filtering the air. In this manner, the marinade is separated from the air. The input for such an extraction installation may be located, inter alia, in the screened-off space where the addition of marinade takes place. By creating a partial vacuum in the screened-off space, the air can be sucked out. Other locations where aromas may escape, for example the buffer store, may be fitted with an air-extraction installation. Preferably, the filter is a heated centrifugal filter, optionally in combination with a preliminary filter. A preliminary filter may serve for separating a large part of the marinade from the air stream, and in particular the relatively large and solid parts of the marinade. The relatively fine droplets and particles can subsequently be removed by the centrifugal filter. The preliminary filter is preferably also heated. An air filter which is known per se may be used as preliminary filter. Preferably, the preliminary filter is mounted at an angle so that the liquid marinade can flow away and can be collected. This marinade may, for example, be supplied to a recycling device.

Advantageously, the device for adding marinade is part of a production line for meat products into which the products to be marinated are introduced, for example by hand. In one advantageous embodiment, the products are attached to carriers by means of which the products are conveyed. In order to marinate as large an area of the meat as possible, it is important for the contact surface between the carrier and the product to be as small as possible.

After the introduction, the product is optionally subjected to a preliminary treatment, such as for example dusting the product with flour. Downstream of the device according to the invention, a product release unit is arranged, after which the products can be packaged. The conveying device is subsequently cleaned, after which new products can be suspended from it.

Advantageously, one or more devices according to the invention foam part of an intelligent system, in which, depending on the demand, a certain amount of product is provided with one marinade and another amount of product or another part of the product is provided with another marinade. It is also possible first to convey the products past a camera, following which a selection of the products to be marinated can be made.

A third aspect of the invention relates to a method and device for electrostatically applying additive particles, such as garnishing leaves or dusting products, on a product suitable for human consumption, in particular a meat product, such as slaughtered poultry or parts thereof.

A known device of this type comprises a charging electrode, additive supply means for supplying additive particles to the charging electrode and means for generating an electric field between the electrode and the product, which has a charge which differs from that of the electrode.

Various ways are known in the prior art for electrostatically applying additive particles to a product suitable for human consumption. WO 00/32051 describes various methods for electrostatically applying additives, in particular electrostatic spraying. In this case, the charging electrode is designed as a nozzle, through which the marinade is sprayed by means of a gas. This method has proved to be unsatisfactory for applying additive particles such as garnishing leaves. WO 9302573 describes an additive-addition device in which the additive particles pass through an electric field as a result of which charged additive particles land on the product. This device has also proved to be unsatisfactory in practice.

It is an object of the third aspect of the present invention to provide an alternative method for electrostatically applying additive particles.

With the method according to the third aspect of the invention, the additive particles are deposited on the charging electrode. The charging electrode is designed as a supporting surface. A charge is applied to the electrode, while the product is earthed or is given a charge which differs from that of the electrode. For example, the products are connected to electrically conductive conveying means which are earthed. As a result of the electric field which is generated in this way, the additive particles charged on or near the electrode leave the supporting surface and jump onto the product, which is at a distance to the electrode.

The third aspect of the invention also provides a device which comprises additive supply means which supply additive particles to a charging electrode which is designed as a supporting surface. In addition, there are means for generating an electric field such that the additive particles leave the supporting surface and jump onto the product, which is at a distance to the electrode.

According to a first embodiment, the electrostatic device is used in a device for processing large quantities of products. Preferably, the additive particles are added in a continuous process. In a preferred embodiment, the products are successively conveyed past the additive particles addition device in groups or individually by means of conveying means.

In one preferred embodiment, a number of electrodes are present, for example for the top and bottom sides of the product.

Preferably, the charging electrode is designed to be elongated and extends along the conveyor track for the products. With an embodiment of this type, the supply of additive particles to the charging electrode and the application of the additive particles on the product may take place continuously.

In a more advantageous embodiment, the charging electrode has a length such that a number of products can be opposite the charging electrode simultaneously, so that the additive particles can simultaneously jump onto a number of products. This is possible in the following situation. When the conveying means for the products comprise carriers which are arranged at a distance from one another, the distance between the products is known. When the length of the charging electrode is greater than this distance between them, there will always be more than one product opposite the electrode.

In another advantageous embodiment, the products move along in their conveying direction while the additive particles jump over. As a result, the product gradually becomes covered with the additive particles.

In another advantageous embodiment, the products can be positioned while the garnishing products are jumping over, to that they can reach as many parts of the product as possible when the charging electrode is only disposed on one side of the product.

Advantageously, a buffer store containing additive particles is present and dosing means in order to set the quantity of particles to be supplied to the products per unit time and, if required, adjust this quantity depending on the number of products and the type of additive to be applied. When a number of electrodes have been positioned, the distribution per electrode can also be set to be different for each electrode. In another advantageous embodiment, means are present for distributing the additive, so that the supply to the electrode is evenly distributed. The distribution of the additives should be even with regard to time as well as place. Means for adjusting the dosage and distribution may be, for example, a hopper, a rotating scraper or slots. It is likewise possible to use a vibrating plate. Advantageously, the vibrating plate is arranged at a slight inclination between the discharge opening of the buffer store and the elongated charging electrode, the charging electrode adjoining the edge of the vibrating plate, but is arranged slightly lower than the vibrating plate. As a result, the additive particles will gradually land on the charging electrode. A vibrating plate can be used for distributing and evening out the supply of additives, but also for loosening any lumps of additive.

Advantageously, screening means are arranged between the product and a part of the conveying means for the products, so that at least part of the transport means is screened off while the additive particles are being added. More advantageously, screening means are also arranged behind the product, viewed in the direction of addition, or around the product. Thus, the additive particles are prevented from spreading in the surroundings.

Advantageously, a collecting unit is placed under the screening means in order to collect the additives which have not landed on the product ('overshoot'). More advantageously, the screening means and the collecting unit are made of an insulating material in order to prevent additives from leaking into the surroundings. In addition, surfaces of conductive material may be arranged in the space created by the screening means and the collecting unit which can affect the movement of the additive particles and thus prevent matter from escaping to the surroundings. In one embodiment, both surfaces are earthed. In another embodiment, a voltage has been applied between the surfaces.

Even more advantageously, the additive particles from the collecting unit are recycled, so that the particles can be reused. Recycling may take place to the vibrating plate. Advantageously, this recycling stream is filtered in order to prevent large parts, for example pieces which have come off the product, from ending up among the additive particles.

The invention also relates to a method for applying an additive, in particular a marinade, to a product suitable for human consumption, in particular a meat product, such as for example slaughtered poultry or parts thereof, in which additive is applied in an additive-application station using an addition device, which addition device discharges additive at a distance from the product, which additive moves to the product through the air and part of which lands on the product, and additive which has not landed on the product is collected and returned to the addition device.

Preferably, the additive application station is fitted with a conveyor having a separate carrier for every bird or part thereof, so that the products are conveyed past the addition device.

Preferably, the returned additive is subjected to a reprocessing treatment before the additive is dispensed again.

The invention will be explained in more detail below with reference to the drawing, in which:

FIG. 1 diagrammatically shows a slaughterhouse for slaughtering and processing poultry fitted with an additive-addition device according to the invention;

Figure 4A:
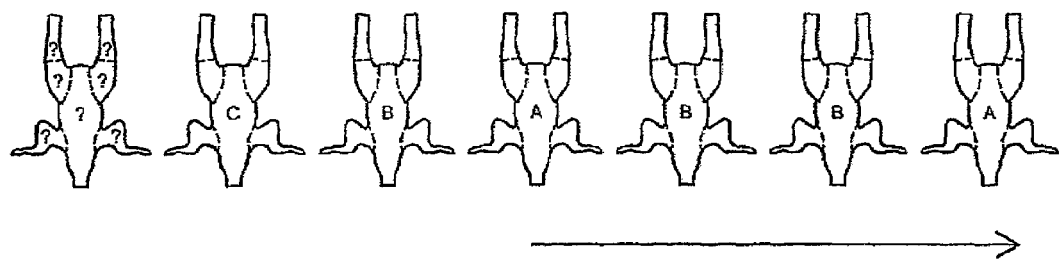
Figure 5:
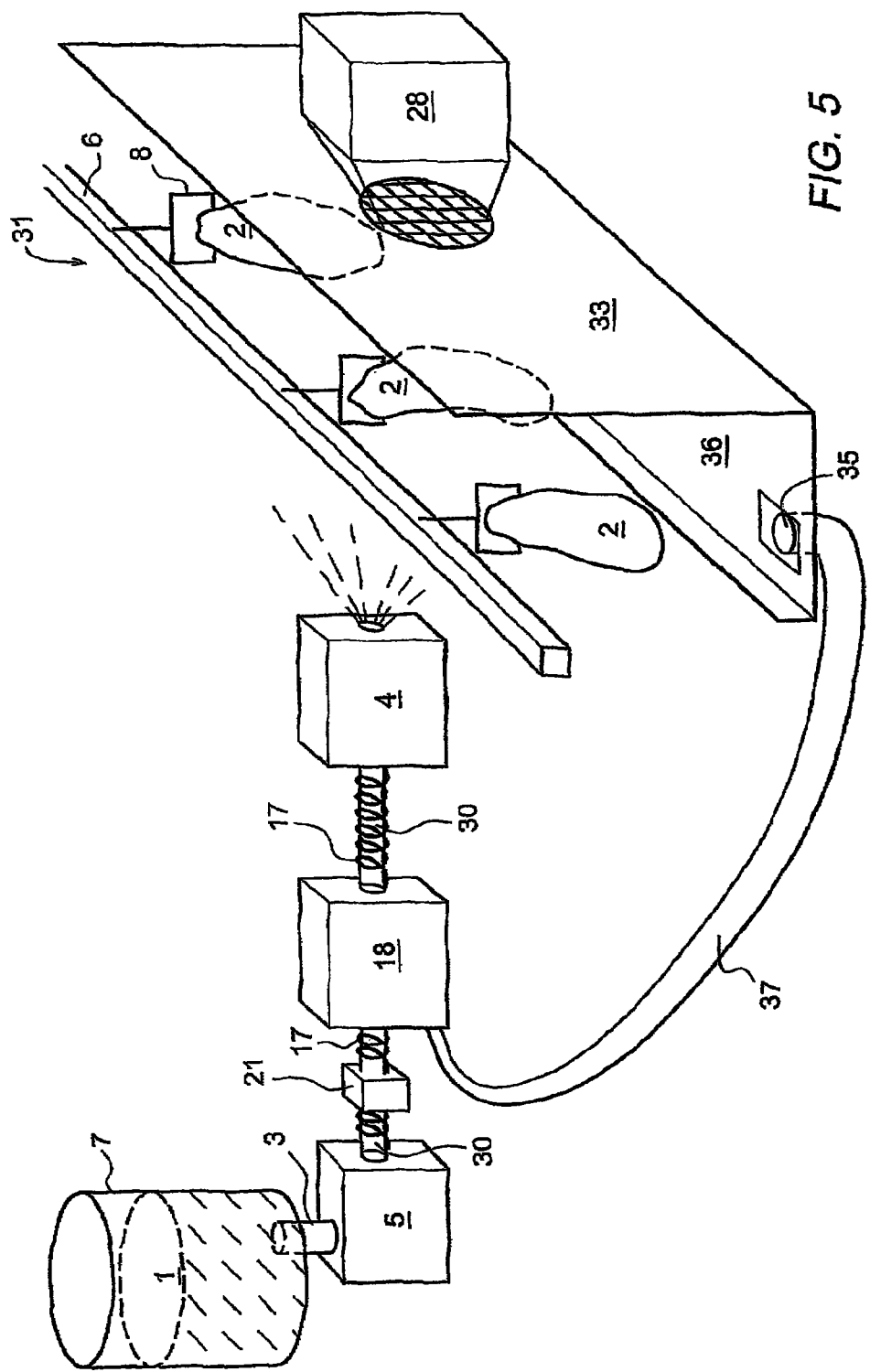
Figure 6:
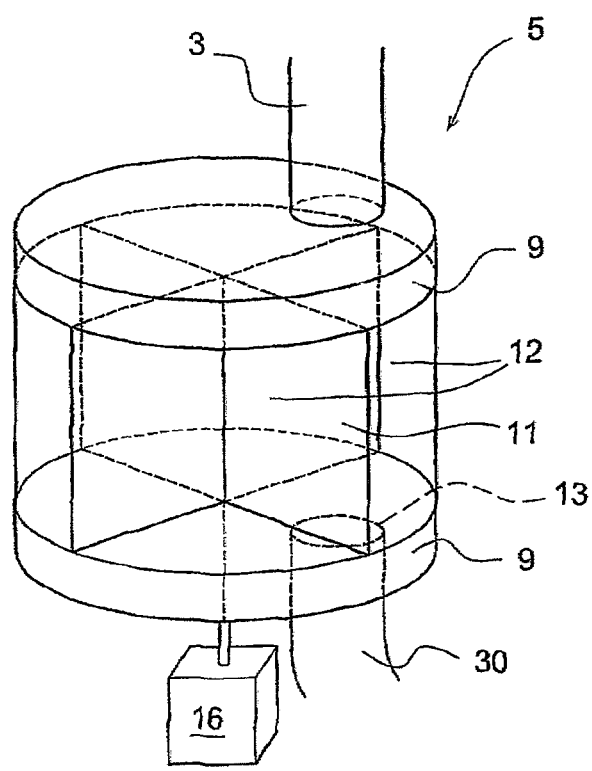
Figure 7:
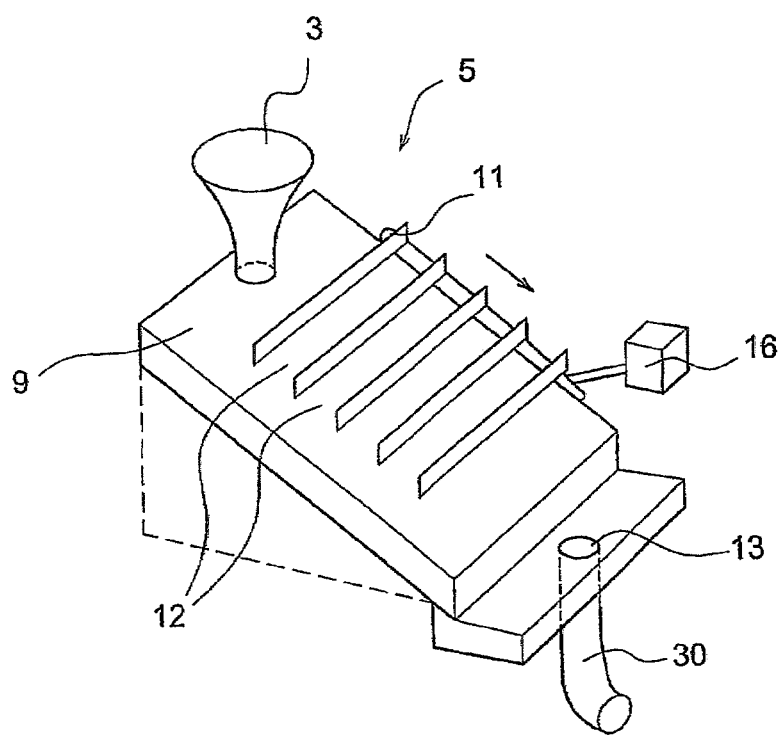
Figure 8:
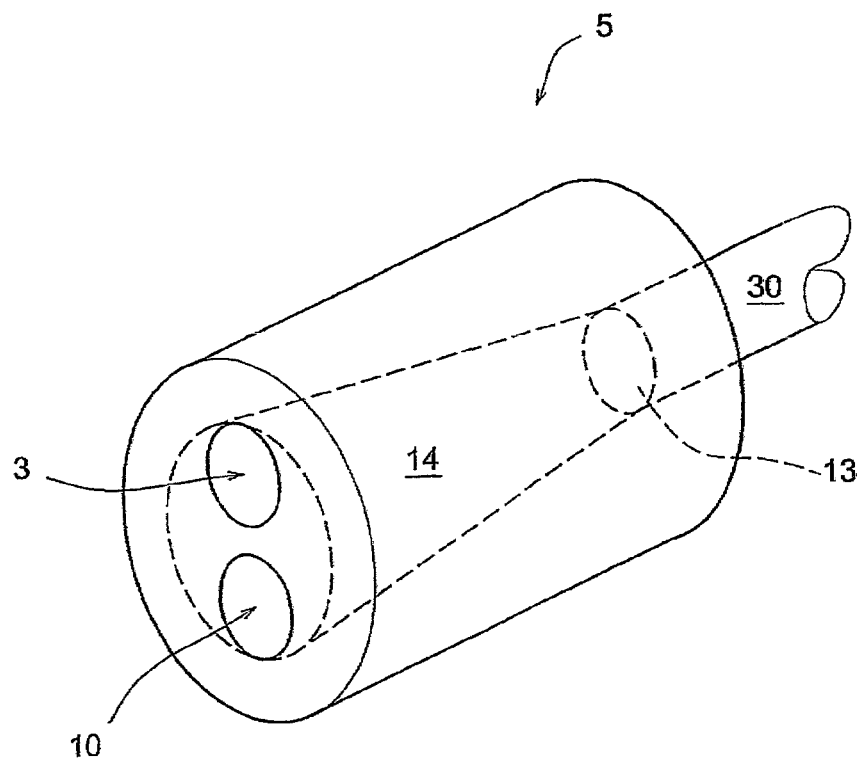
Figure 9:
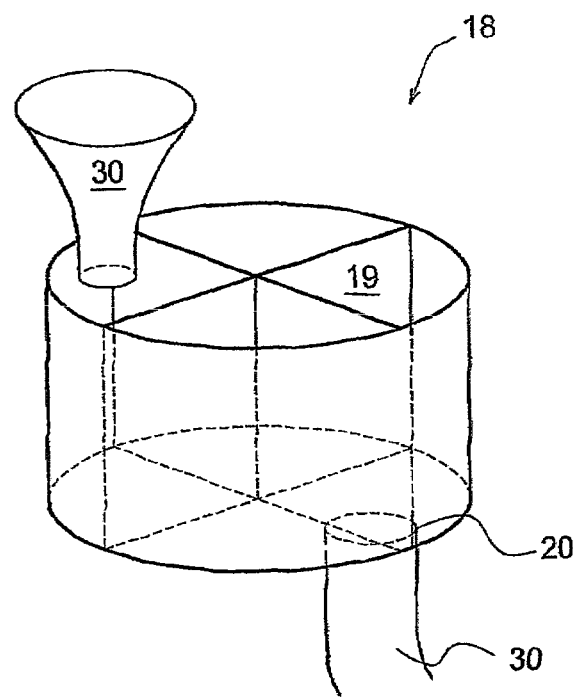
Figure 10:
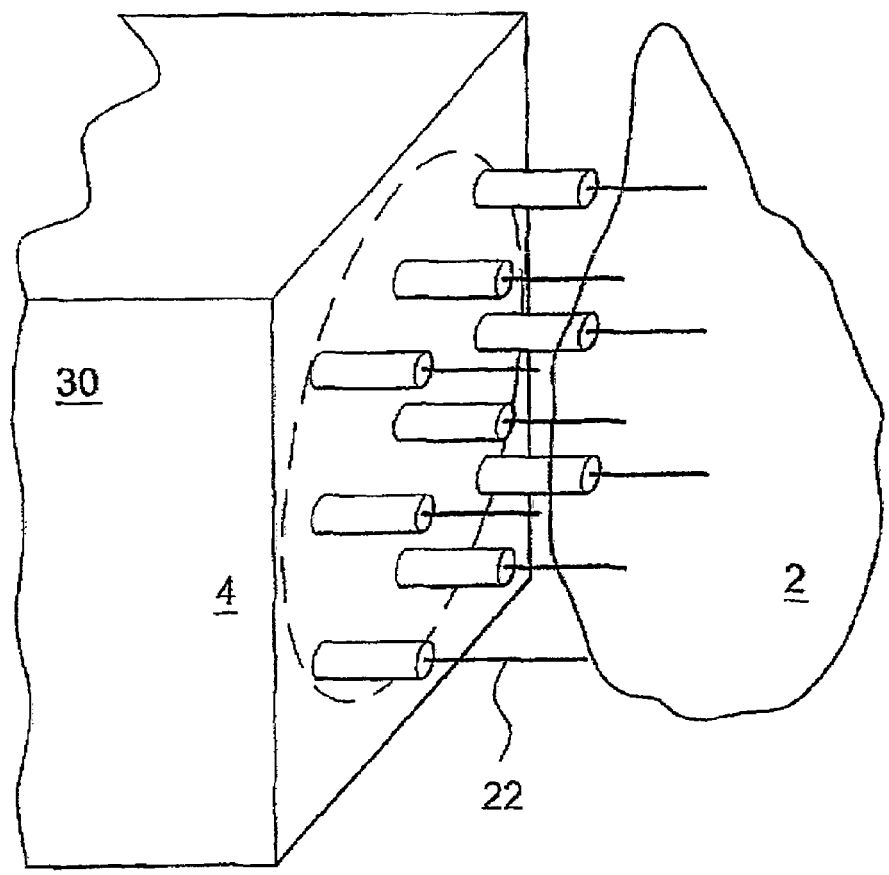
Figure 11:
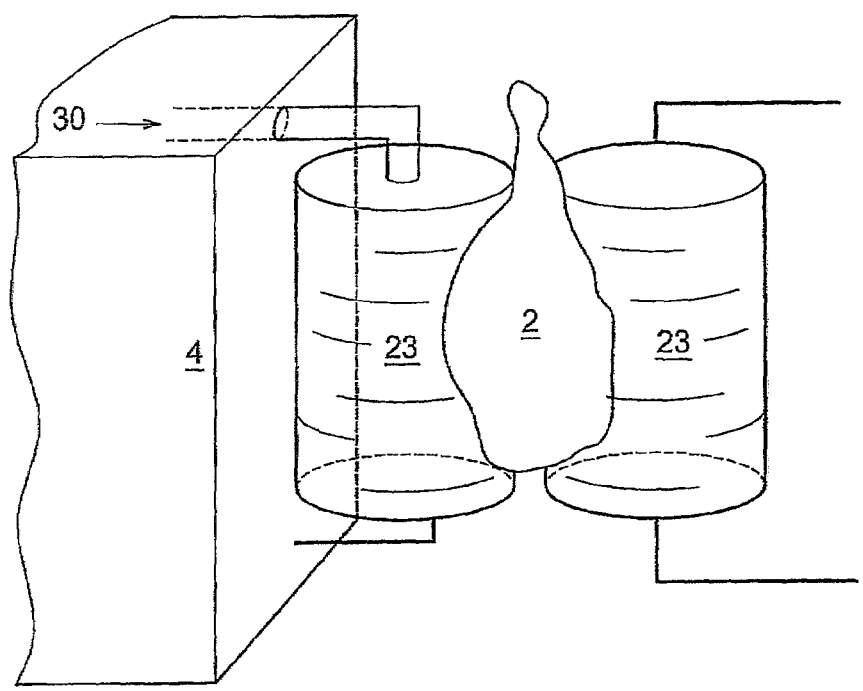
Figure 13:
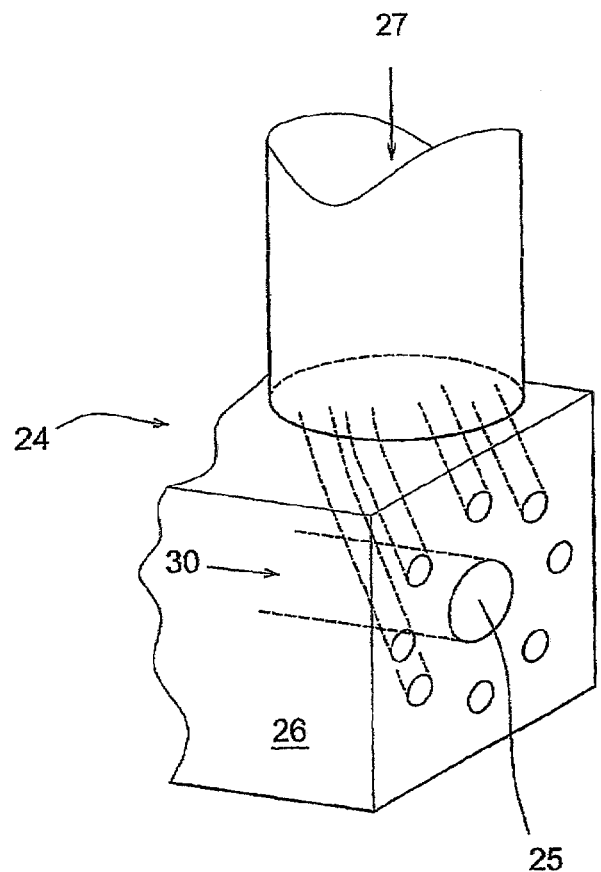
Figure 14:
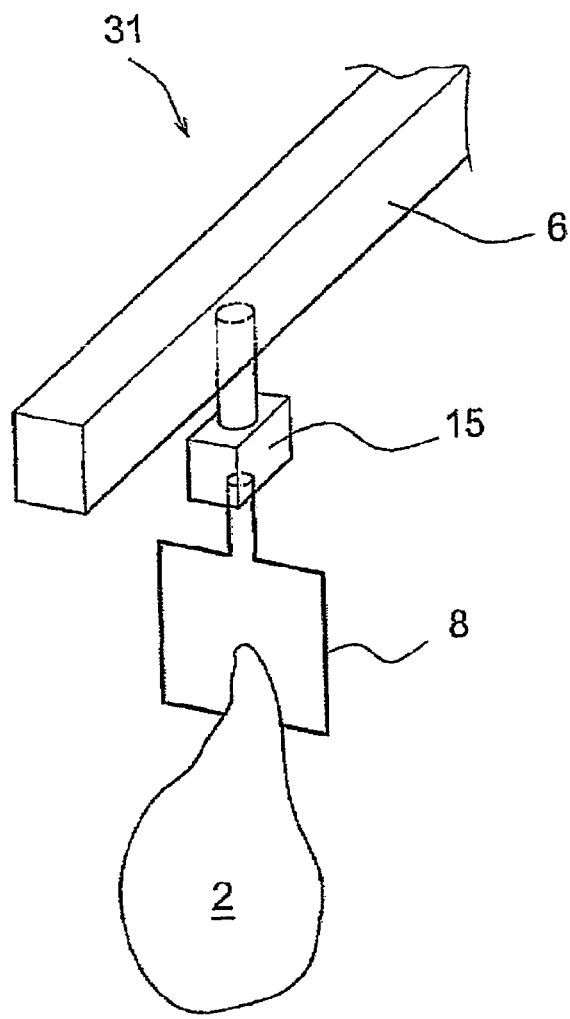
Figure 15:
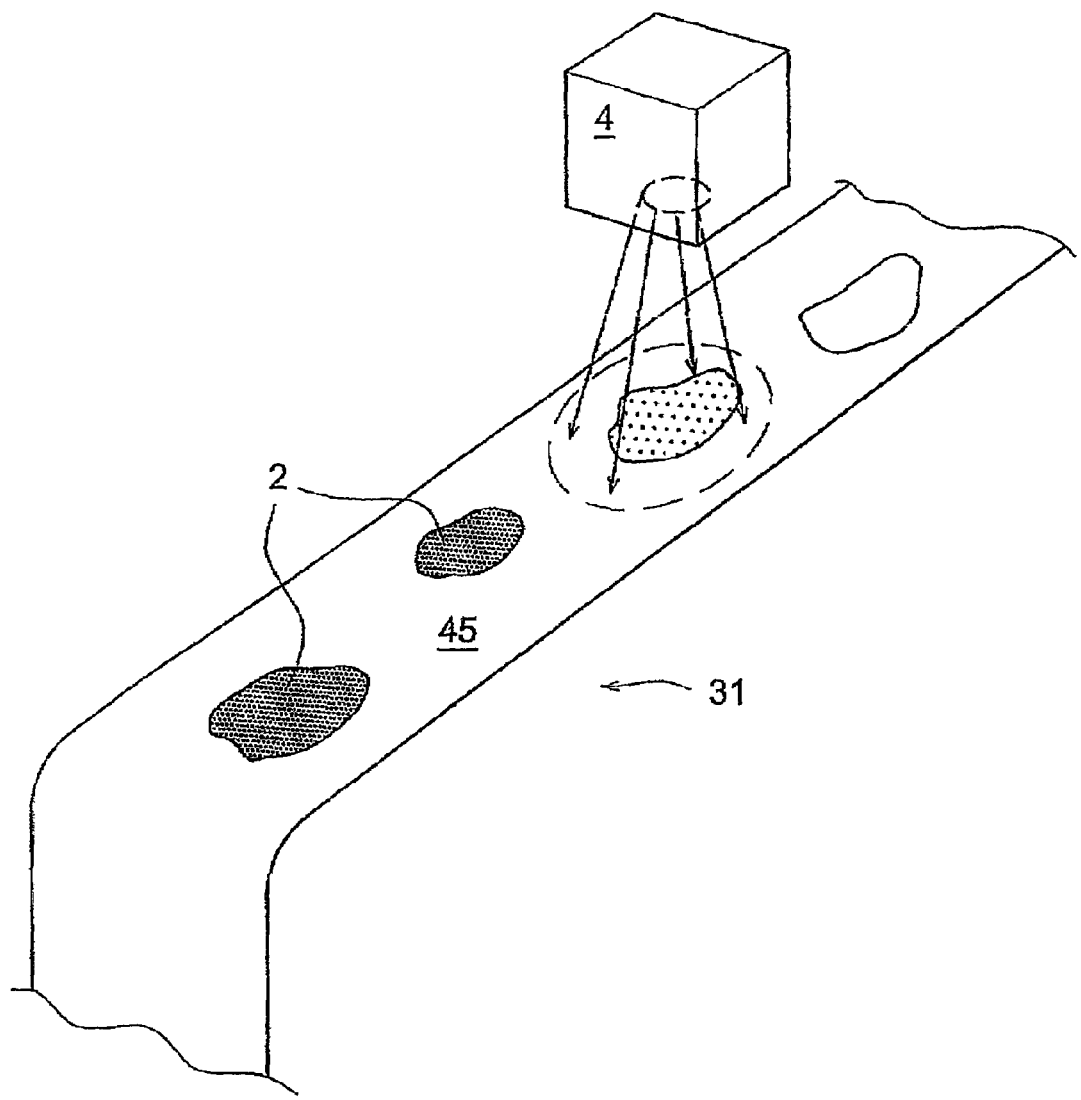
Figure 16:
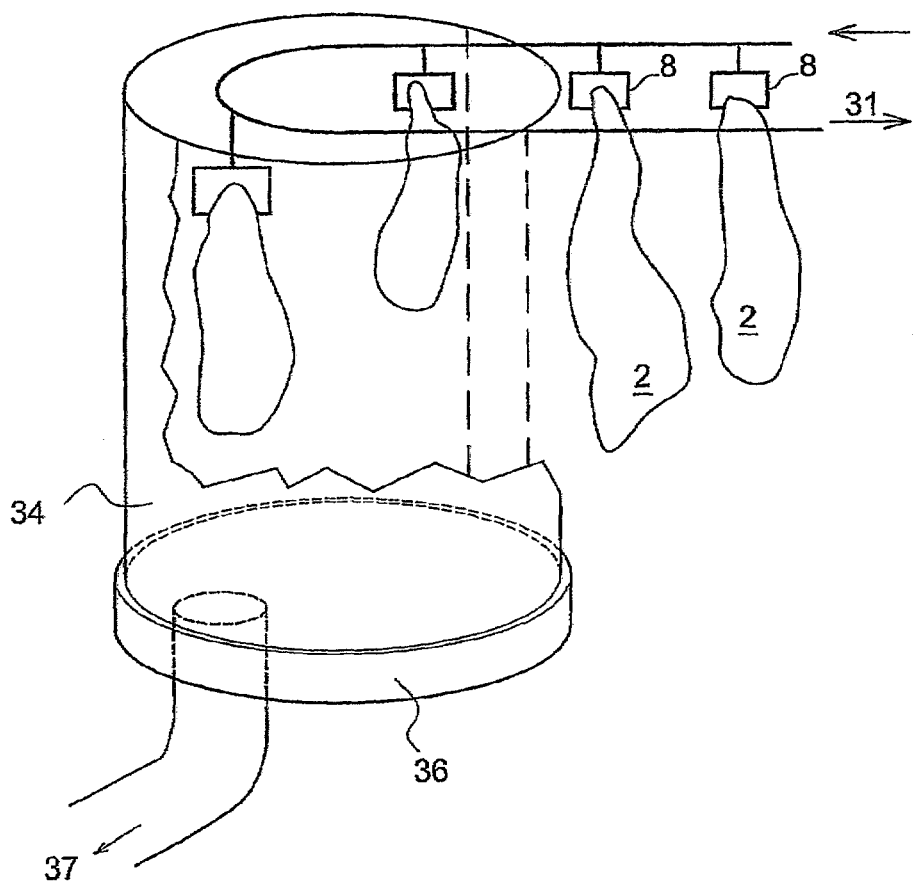
Figure 17:
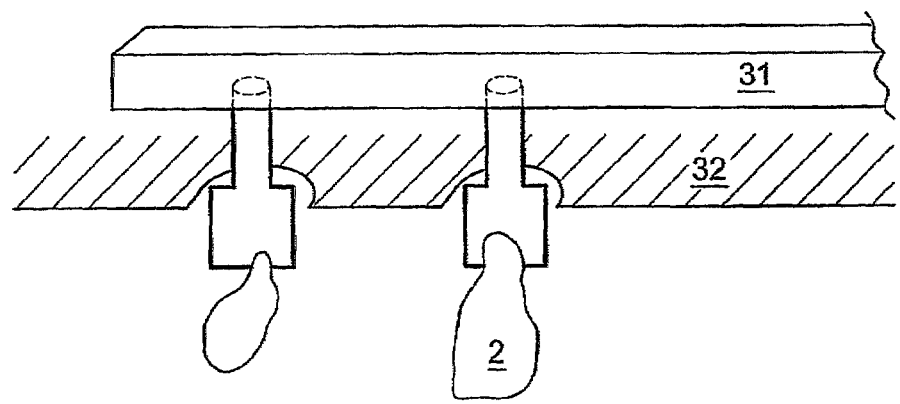
Figure 18:
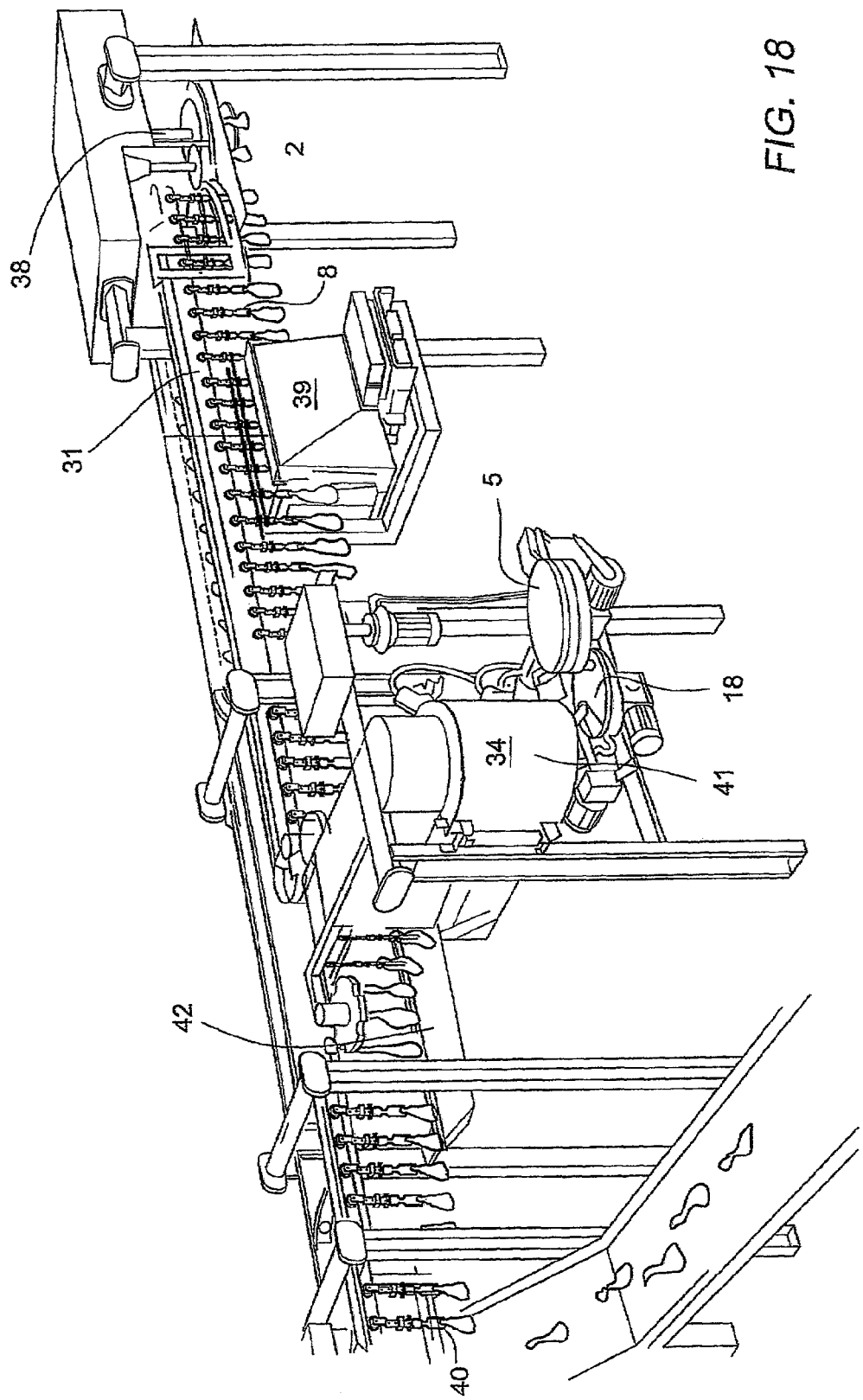
Figure 19:
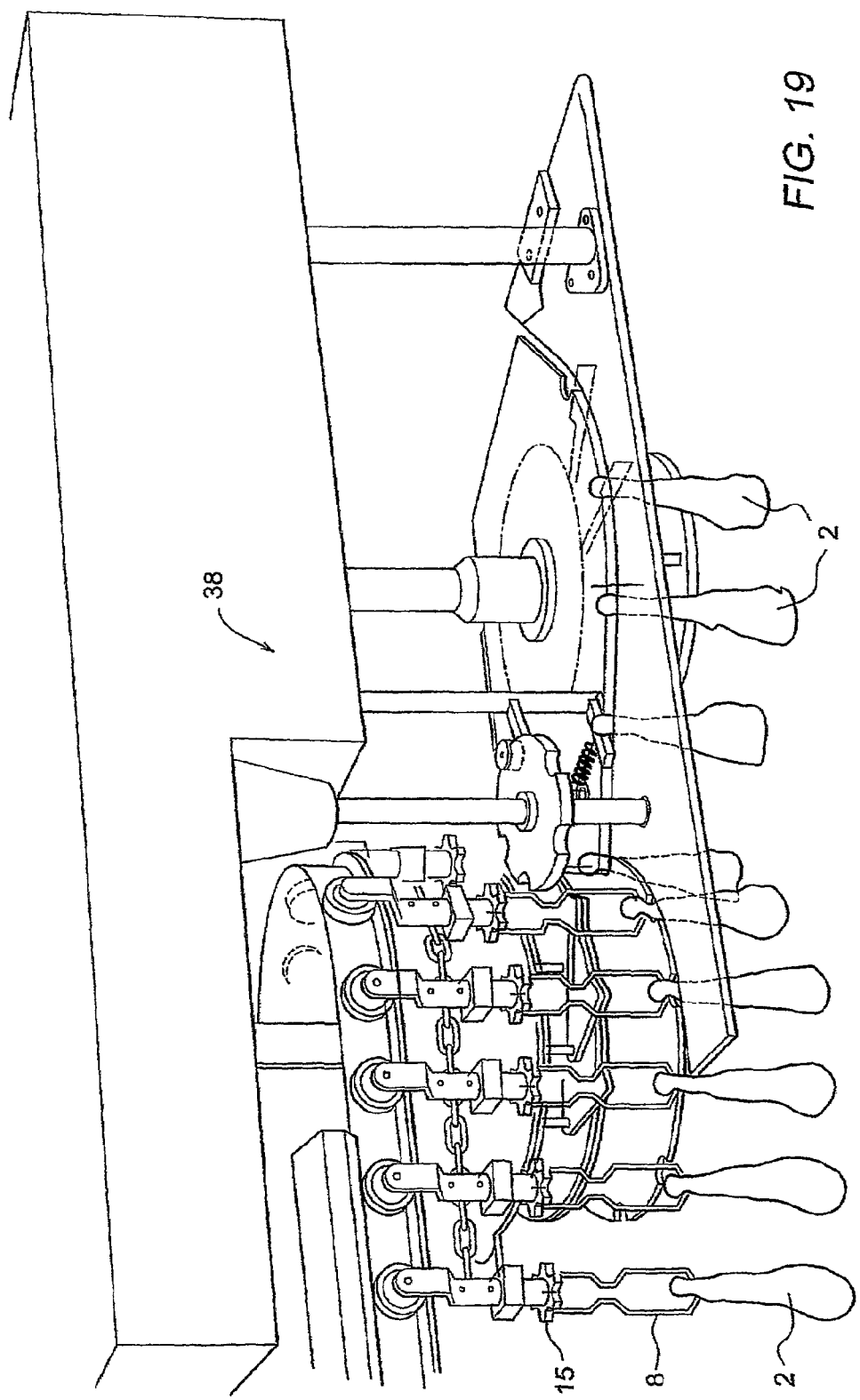
Figure 20:
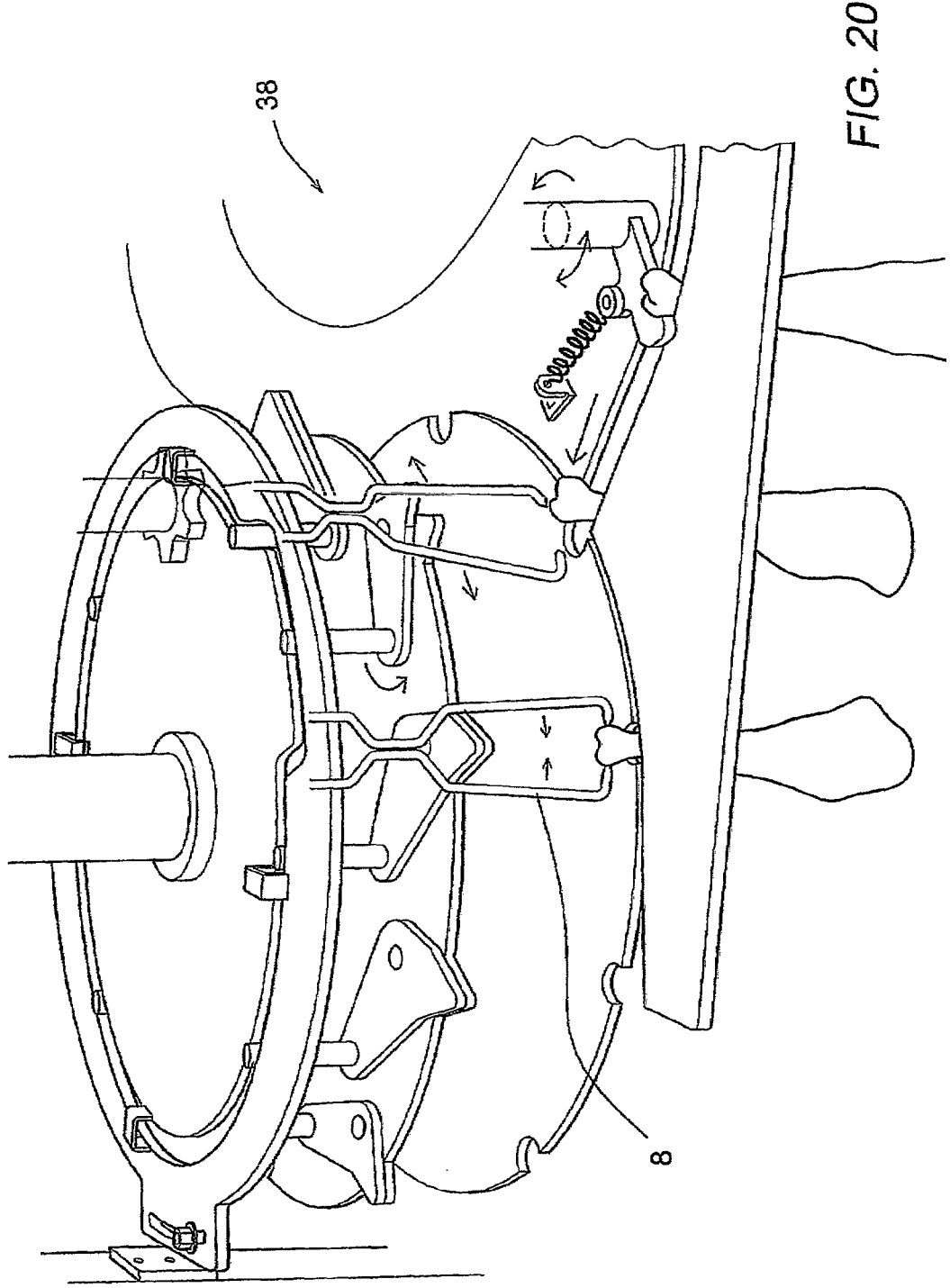
Figure 21:
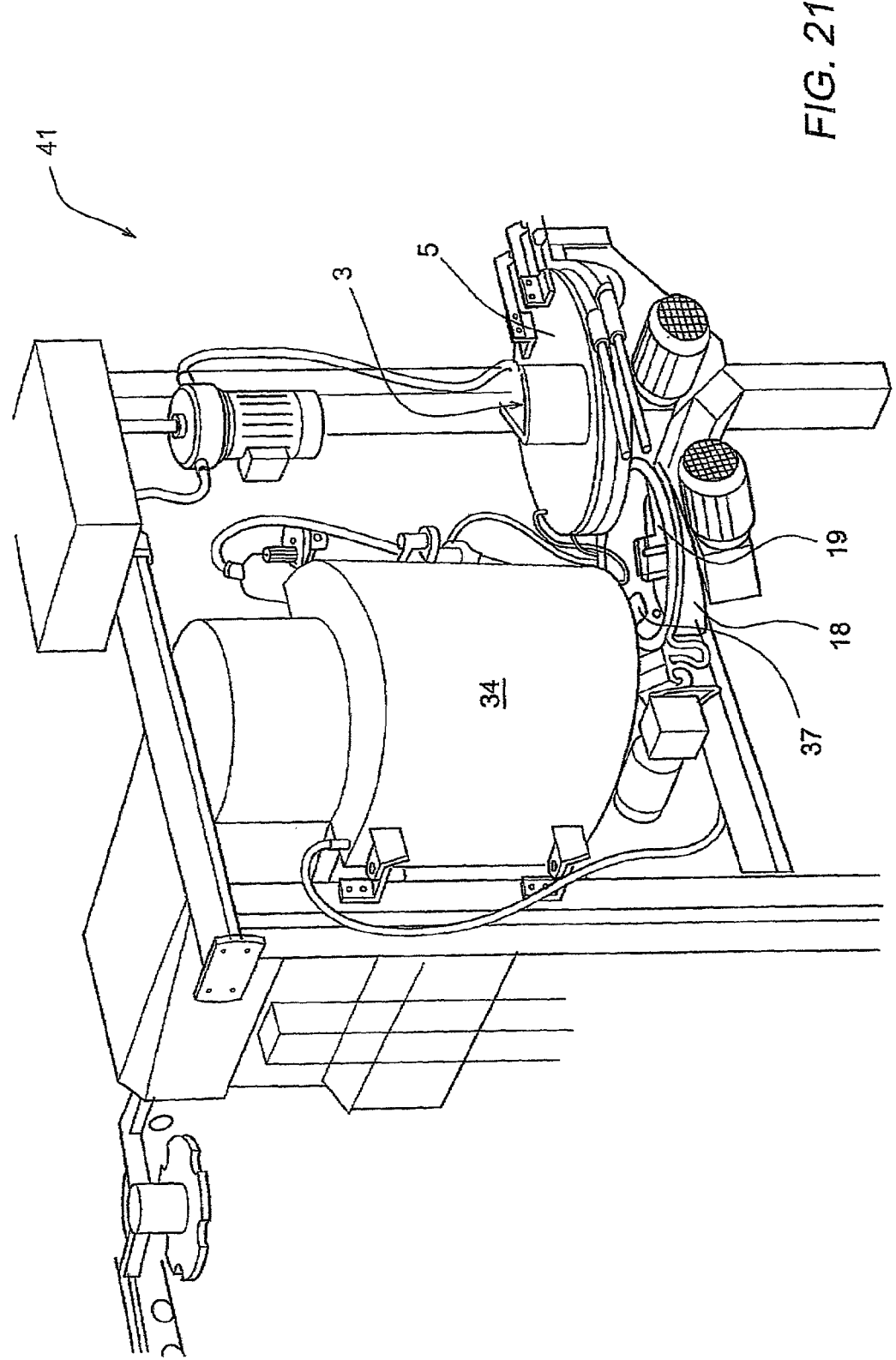
Figure 22:
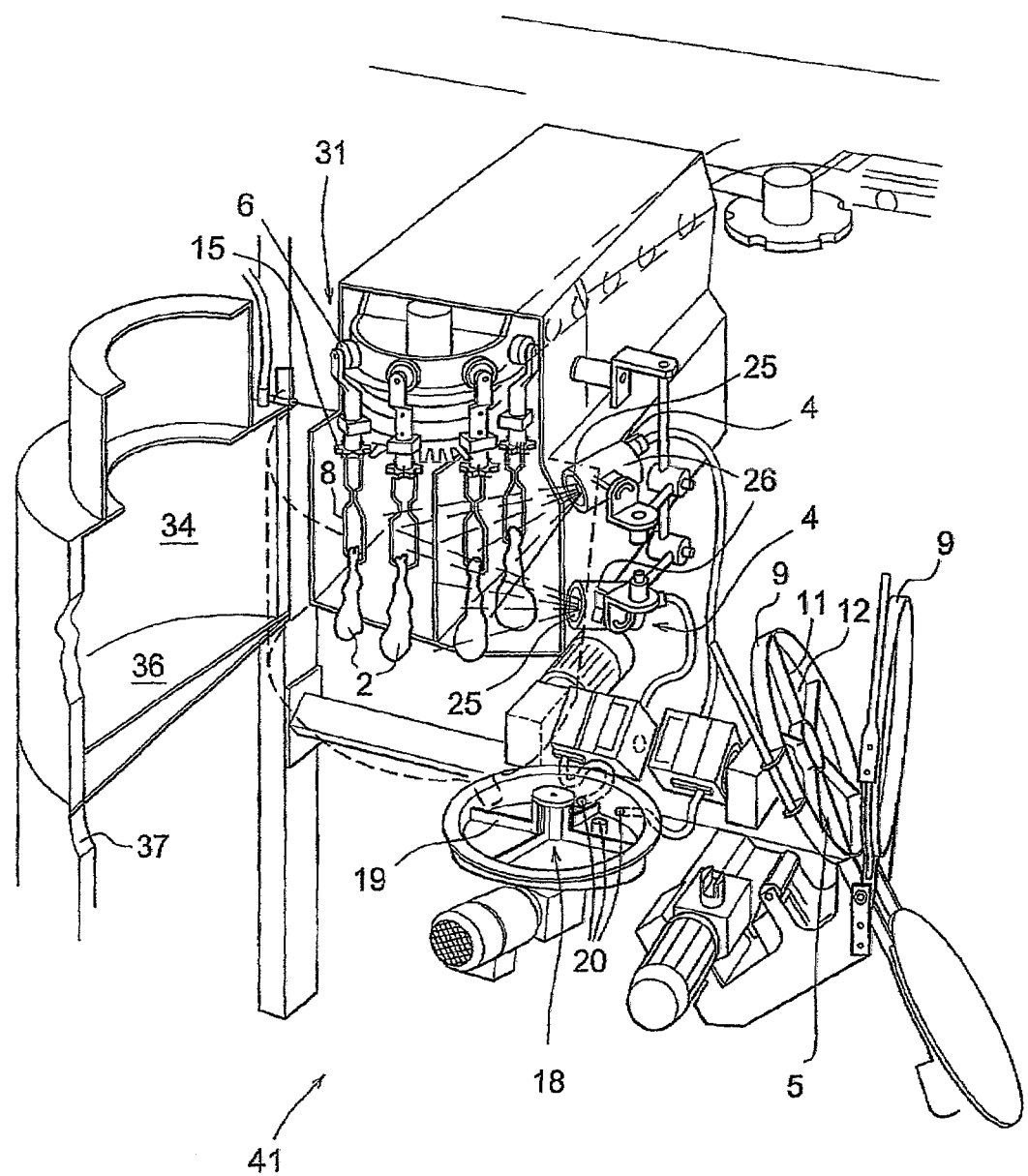
Figure 23:
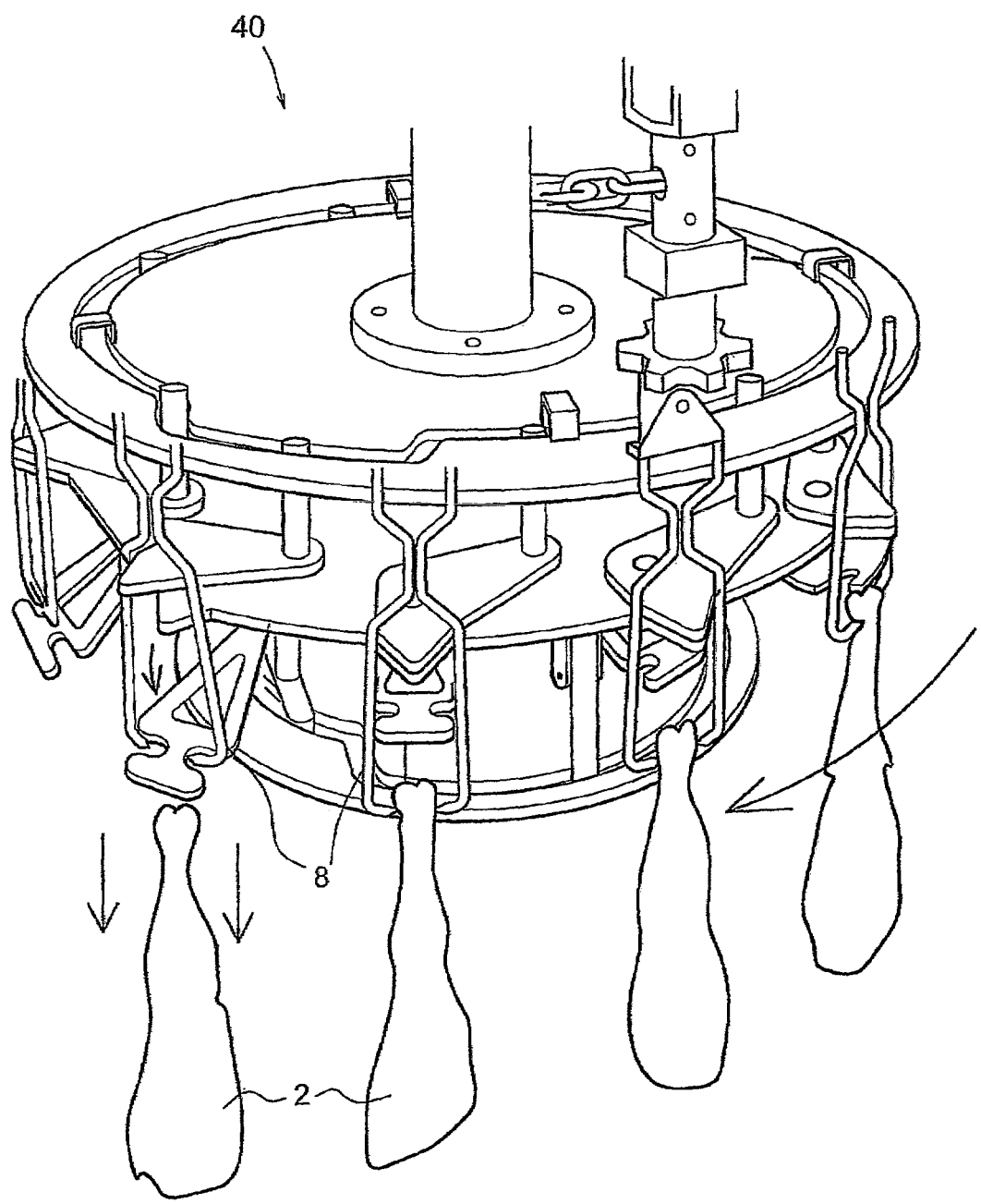
Figure 24:
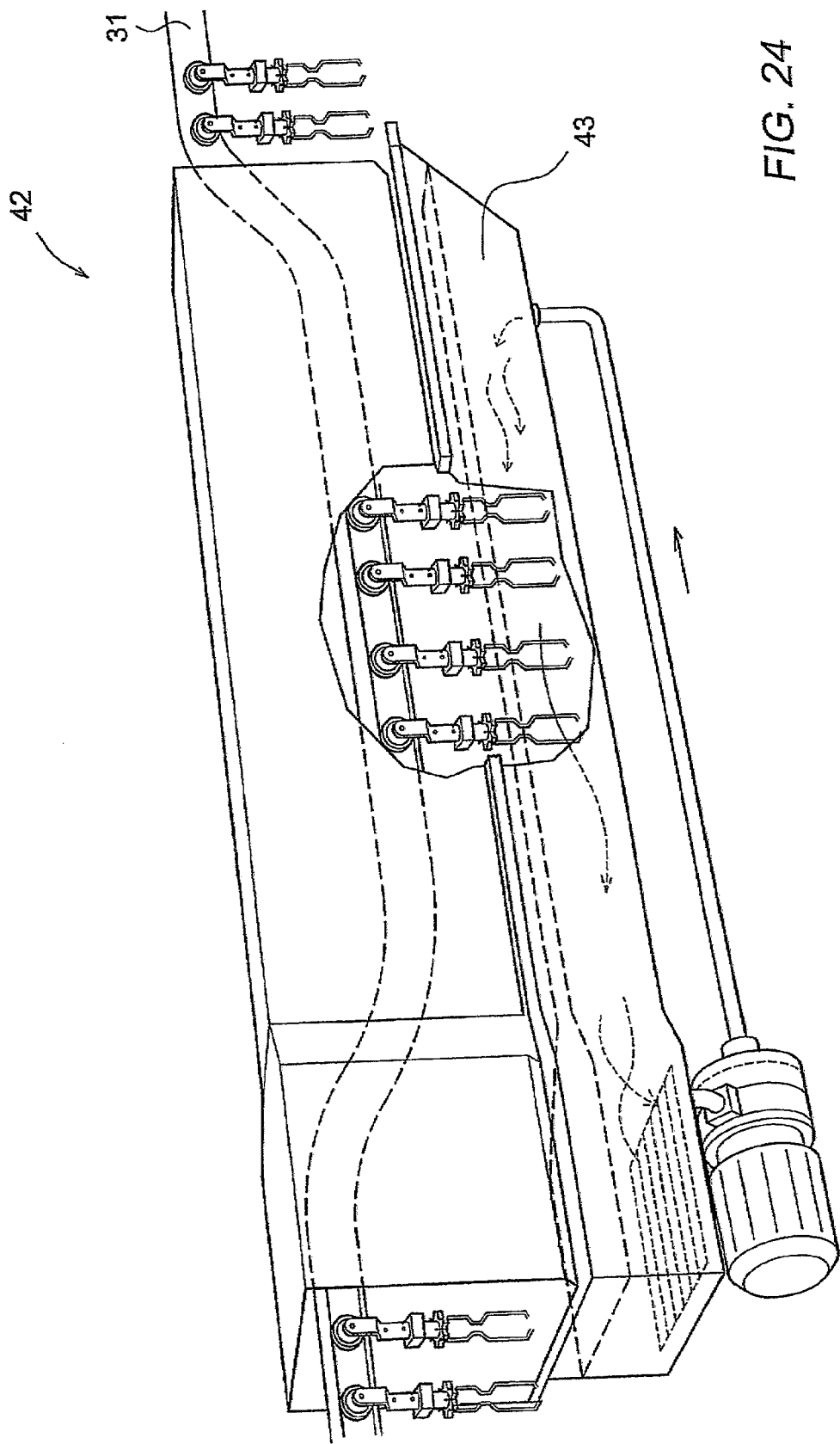
Figure 25:
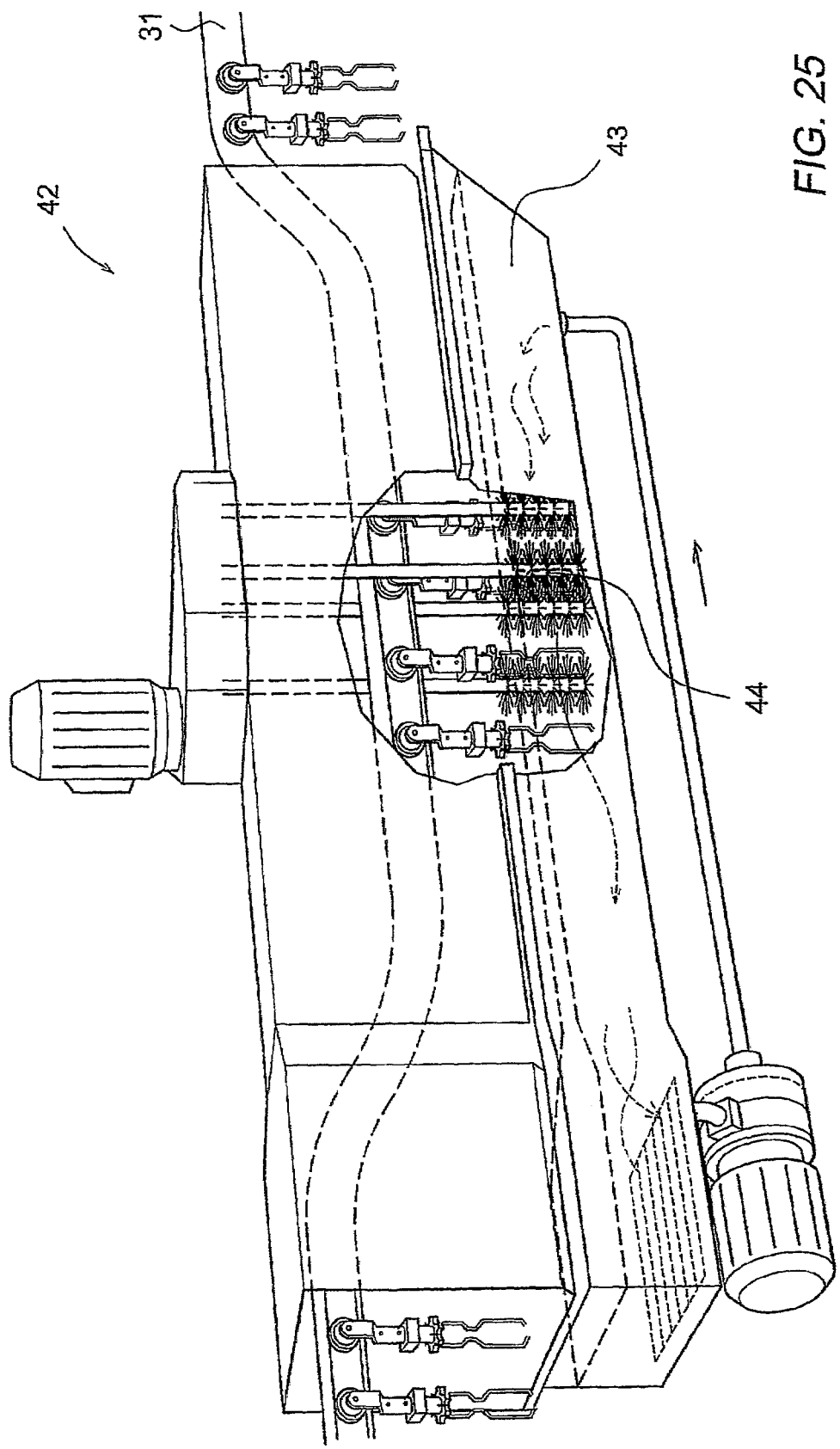
Figure 26:
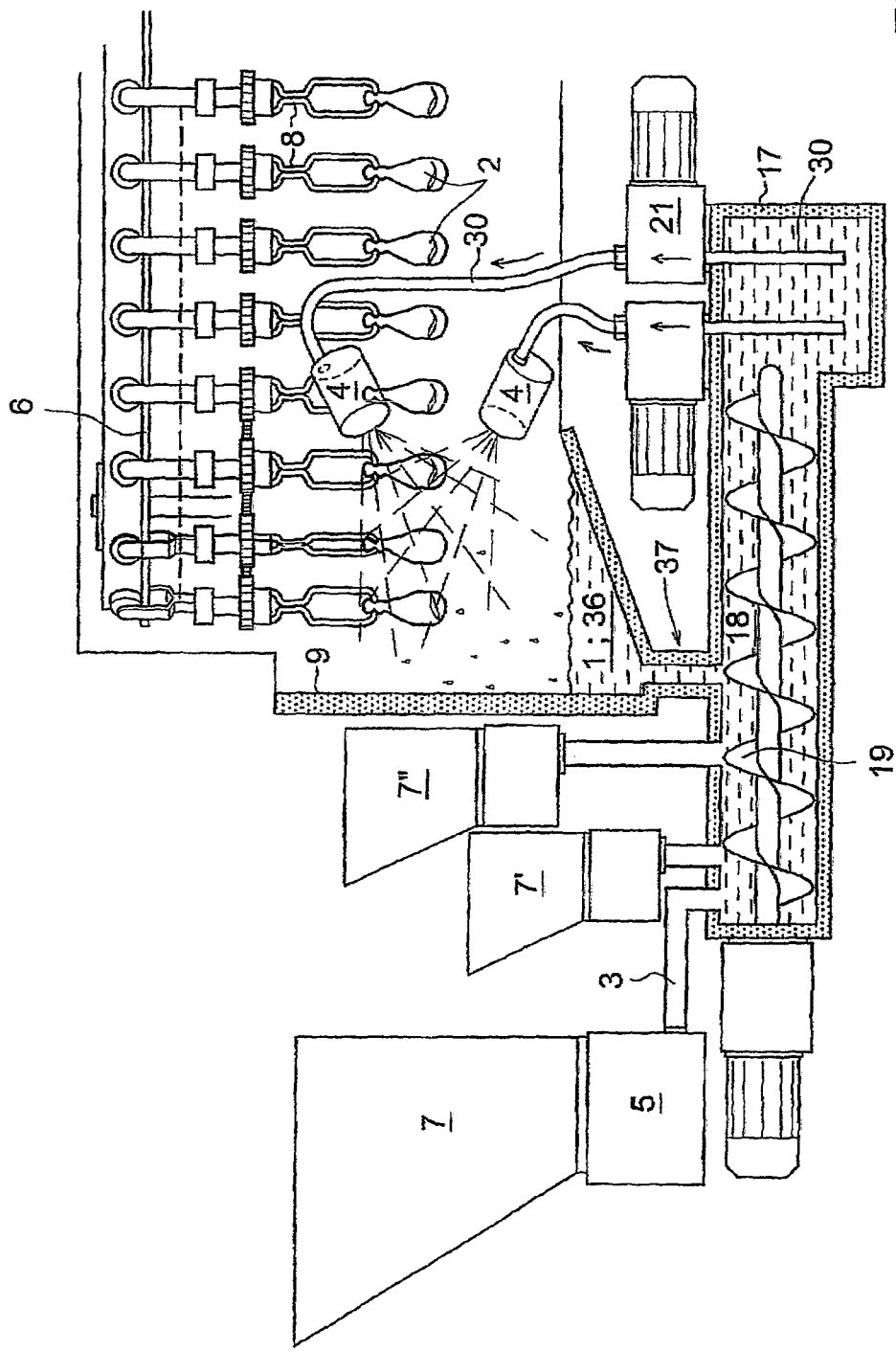
Figure 27:
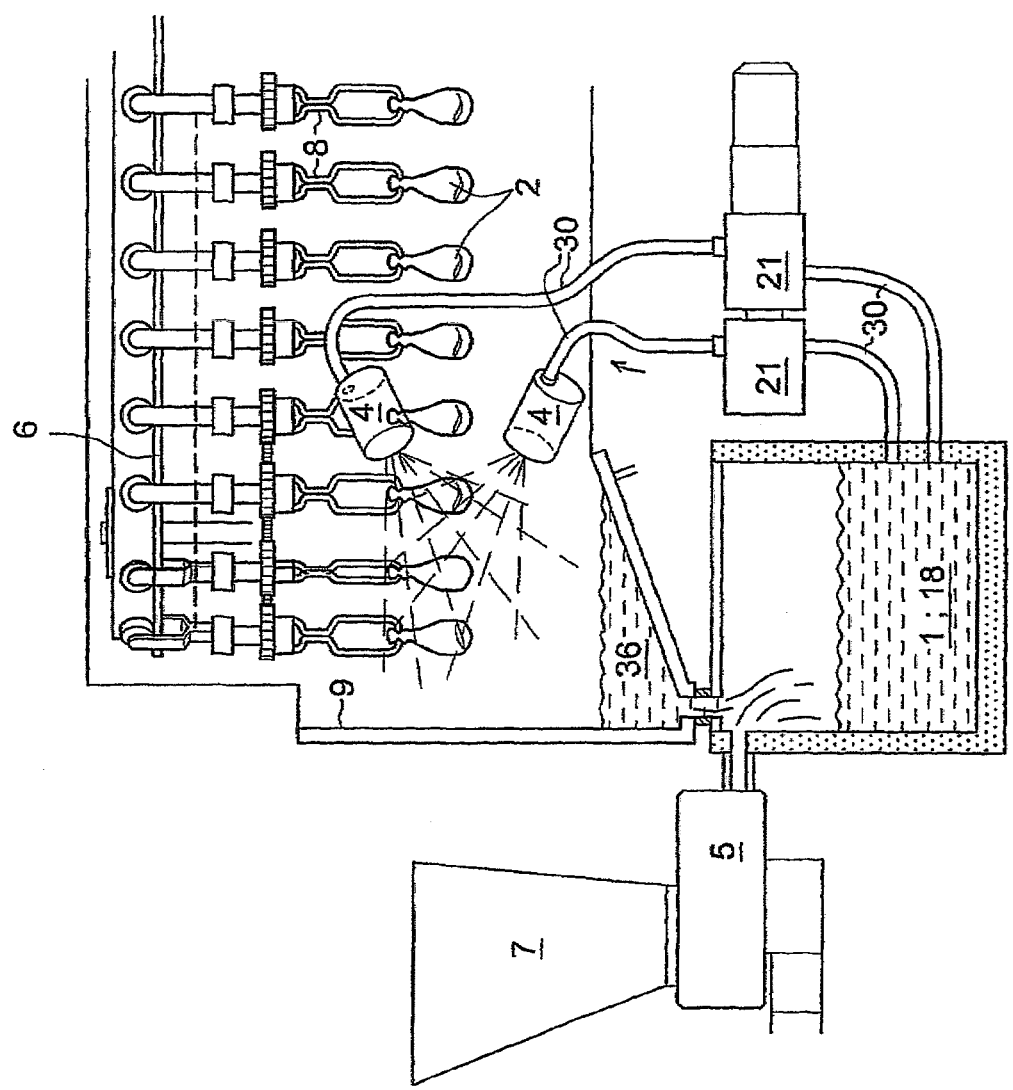
Figure 28:
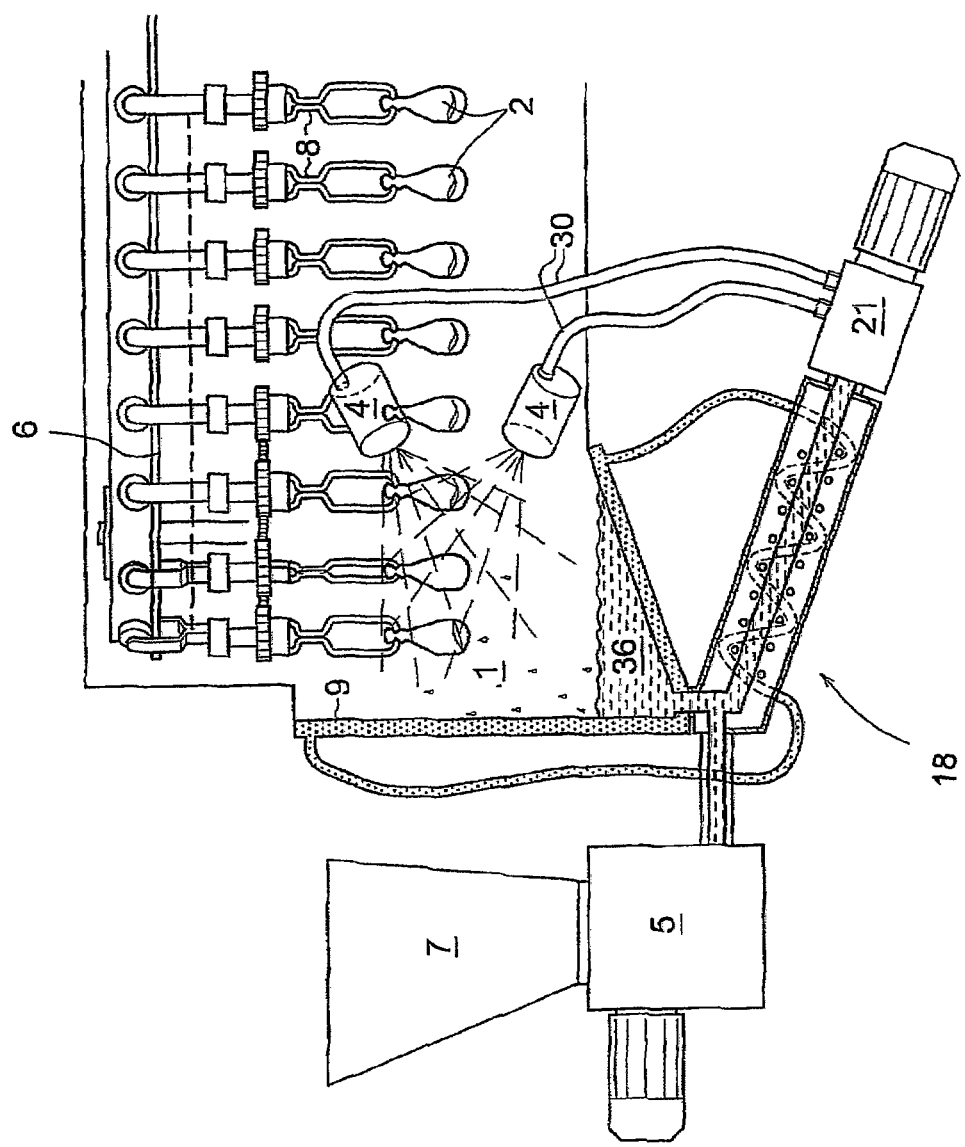
Figure 29:
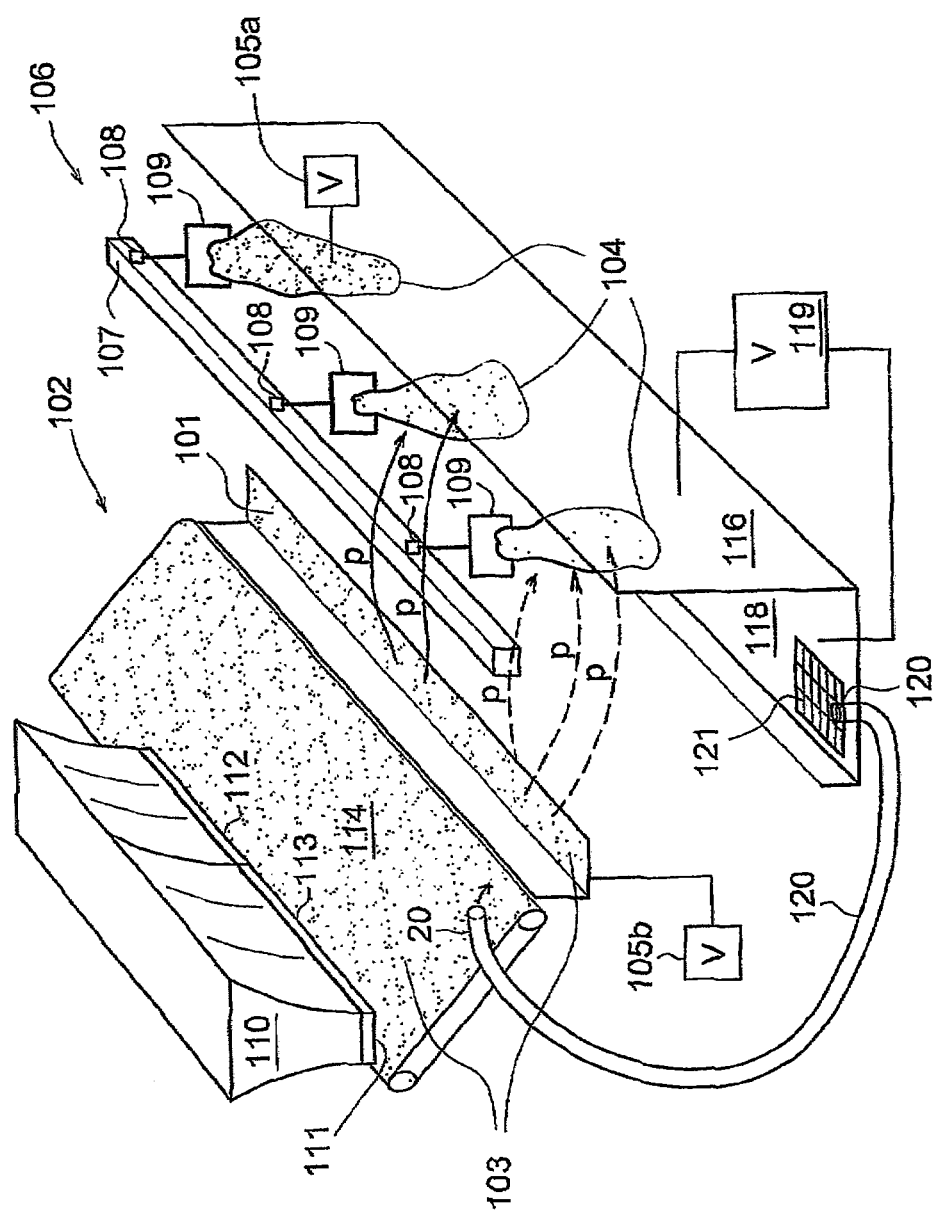
Figure 30:
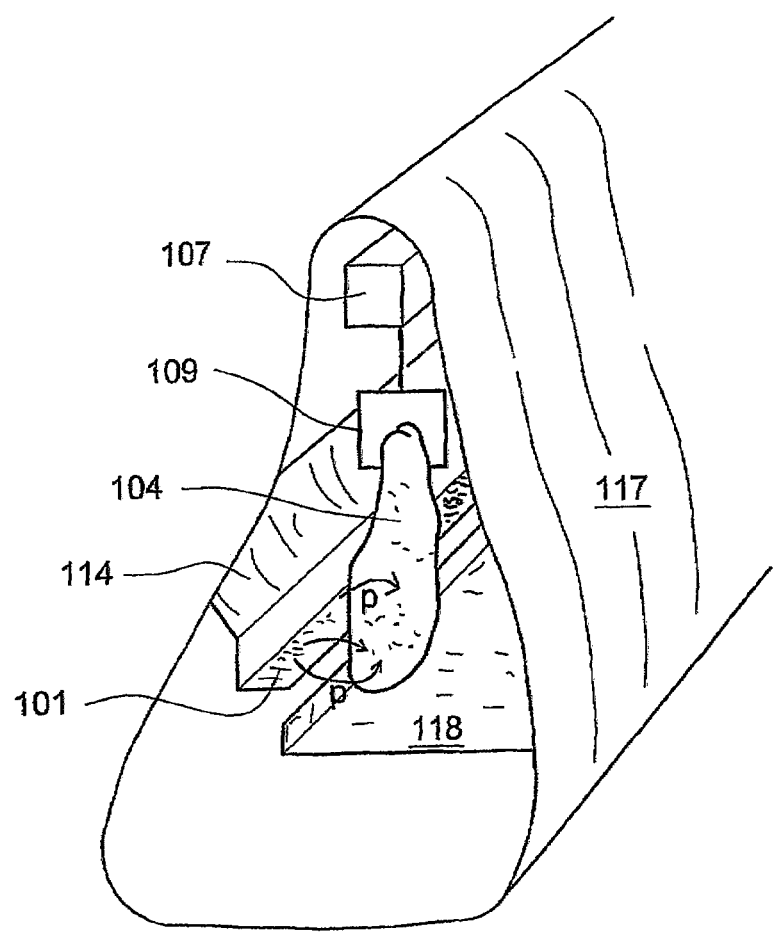
Figure 31:
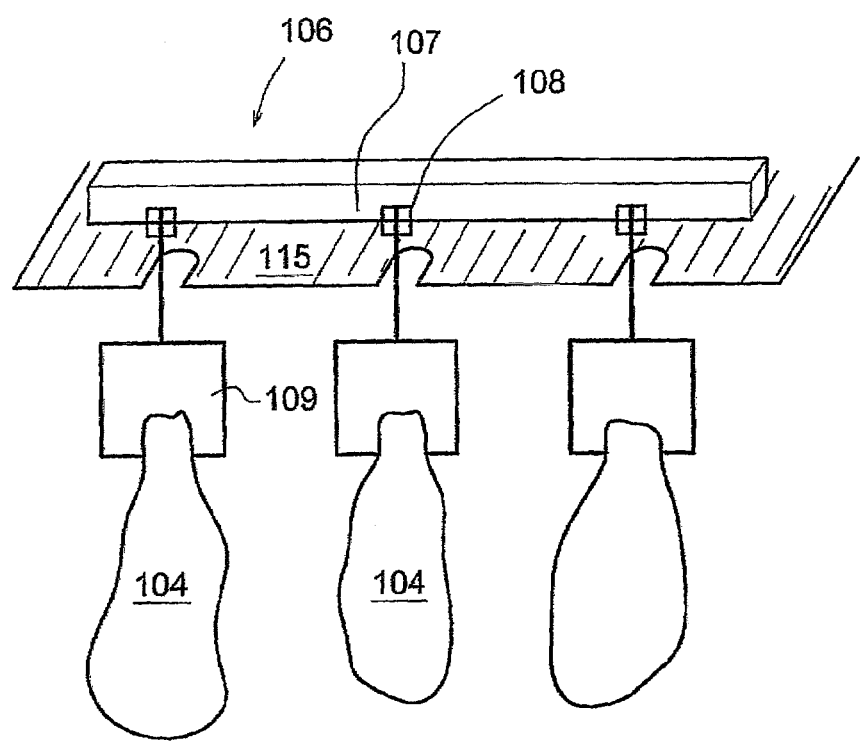
Figure 32:
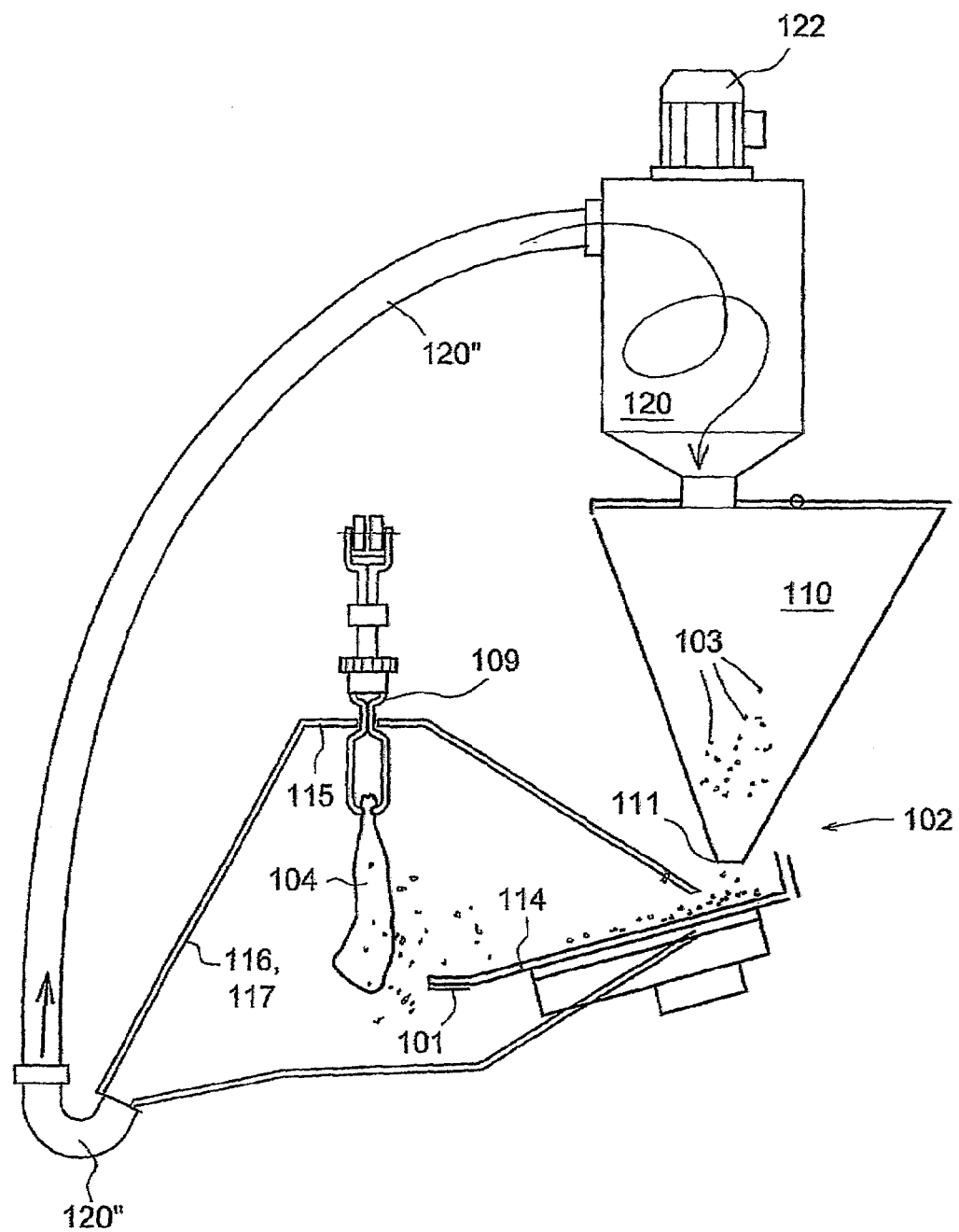
Figure 33:
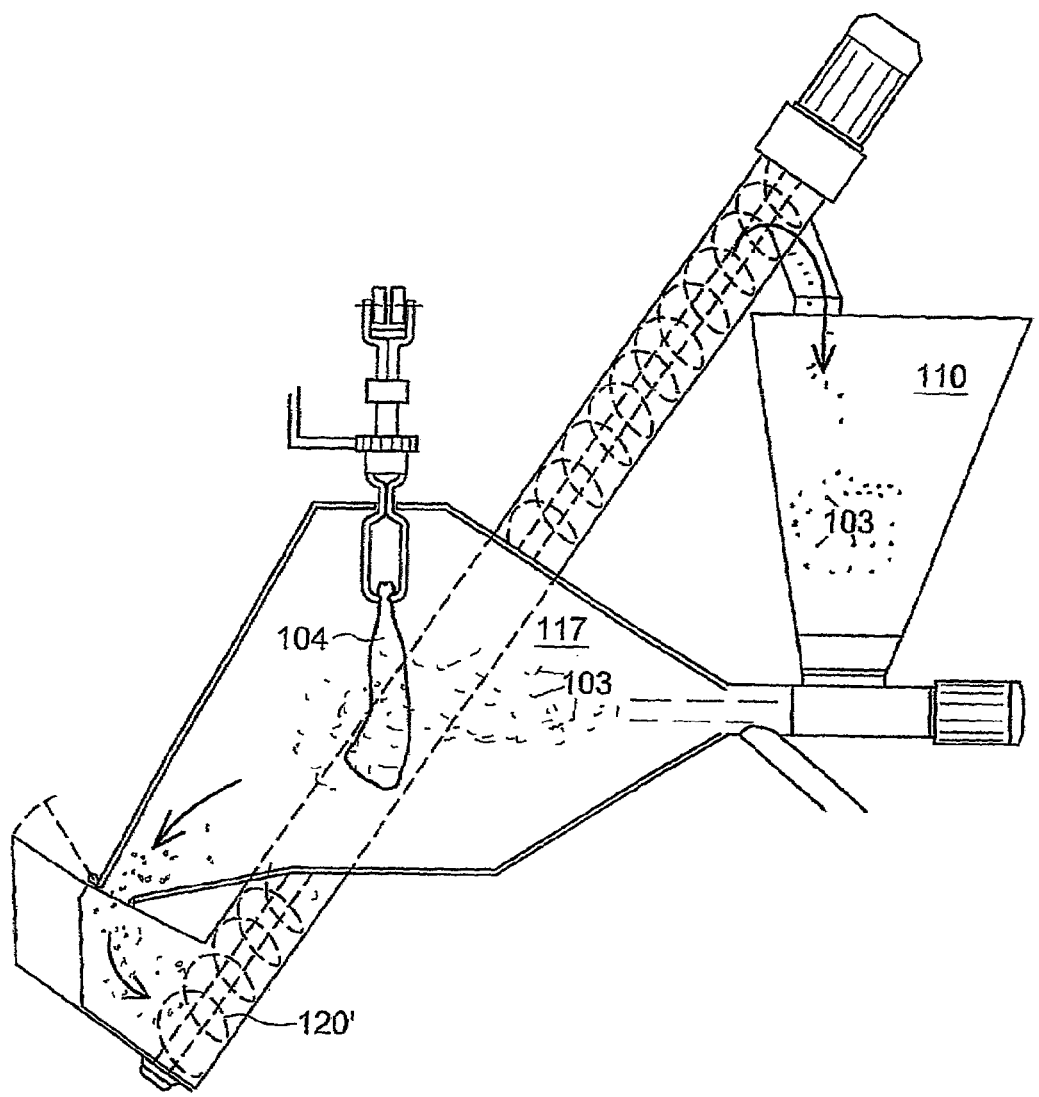
Figure 34:
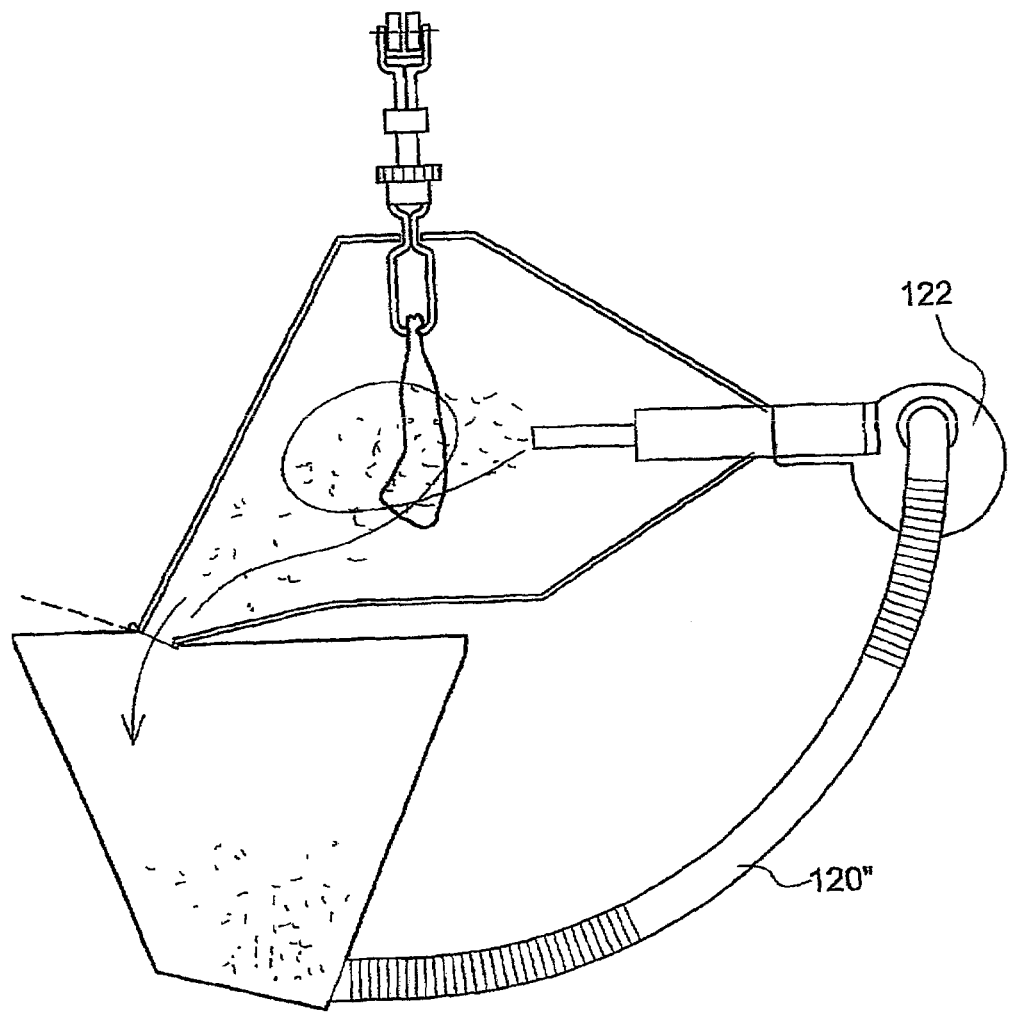
Figure 35:
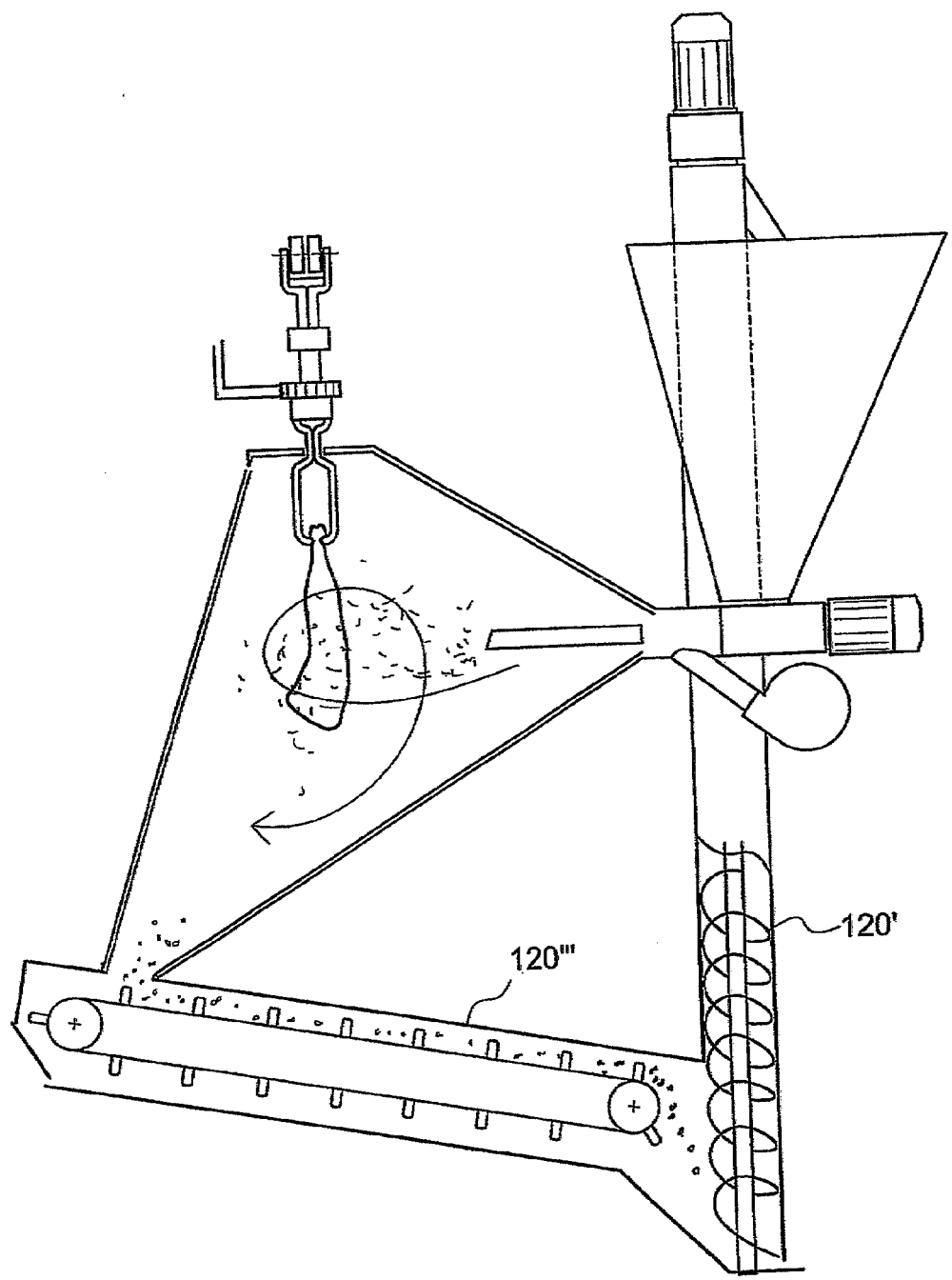

FIGS. 4a, b diagrammatically shows the assignment of a quality grade to an entire bird and to specific parts of a bird, respectively;

FIG. 5 shows an exemplary embodiment of the device according to the second aspect of the invention;

FIG. 6 shows a first diagrammatic representation of heating means;

FIG. 7 shows a second diagrammatic representation of heating means;

FIG. 8 shows a third diagrammatic representation of heating means;

FIG. 9 shows a diagrammatic representation of a buffer store;

FIG. 10 shows a first diagrammatic representation of addition means;

FIG. 11 shows a second diagrammatic representation of addition means;

FIG. 12 shows a third diagrammatic representation of addition means;

FIG. 13 shows a fourth diagrammatic representation of addition means;

FIG. 14 shows an embodiment of the conveying means;

FIG. 15 shows a second embodiment of the conveying means;

FIG. 16 shows an embodiment of screening means for screening off the surroundings;

FIG. 17 shows an embodiment of screening means for screening off the conveying means;

FIG. 18 shows the positioning of the device according to the second aspect of the invention in a production line;

FIGS. 19 and 20 show an embodiment of a suspension device;

FIG. 21 shows a perspective view of a device according to the second aspect of the invention;

FIG. 22 shows a cut-away perspective view of a device according to the second aspect of the invention;

FIG. 23 shows a sketch of a possible embodiment of a release device;

FIGS. 24 and 25 show embodiments of cleaning devices for the conveying means;

FIG. 26 shows another possible embodiment of the device according to the second aspect of the invention;

FIG. 27 shows yet another possible embodiment of the device according to the second aspect of the invention;

FIG. 28 shows yet another possible embodiment of the device according to the second aspect of the invention;

FIG. 29 shows a diagrammatic overview of the device according to the third aspect of the invention;

FIG. 30 shows a second preferred embodiment of the device according to the third aspect of the invention;

FIG. 31 shows a detail of a preferred embodiment of the device;

FIG. 32 shows a possible recycling device;

FIG. 33 shows another possible recycling device;

FIG. 34 shows yet another possible recycling device;

FIG. 35 shows yet another possible recycling device again; and

Figure 36:
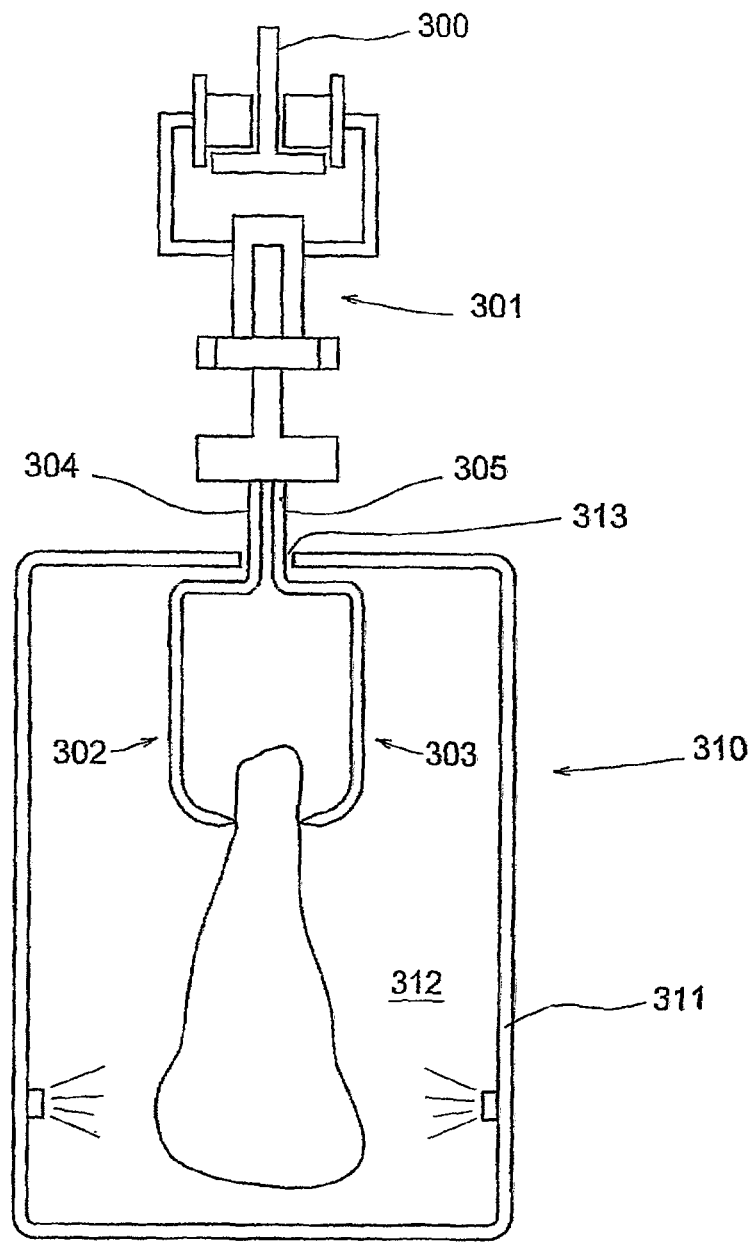
Figure 37A:
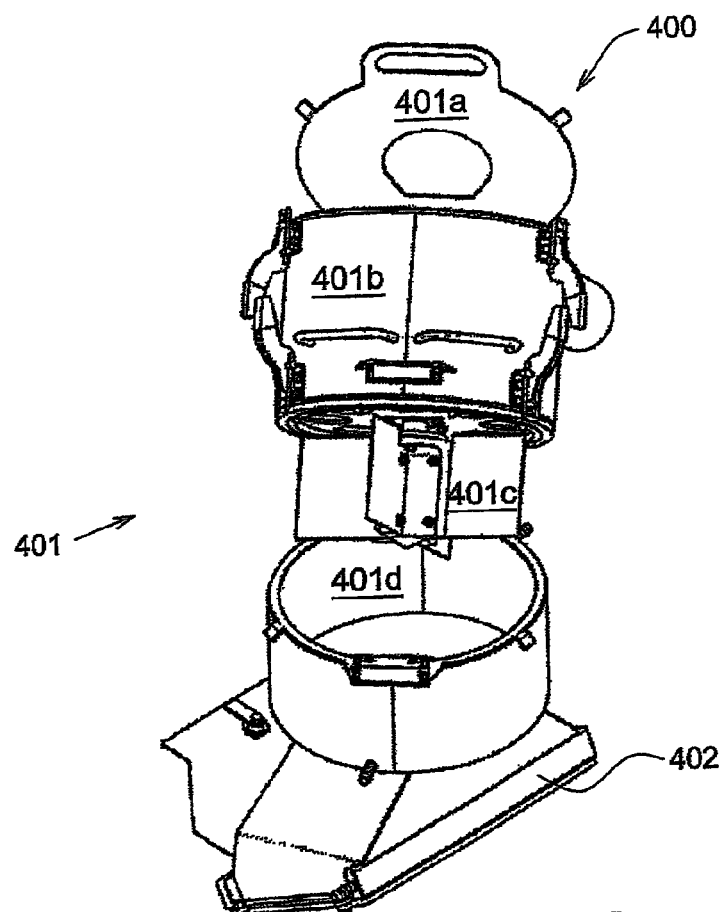

FIG. 36 shows a sectional view of an additive-addition device according to the invention, FIGS. 37a and b show an embodiment of a preliminary filter.

Figure 1:
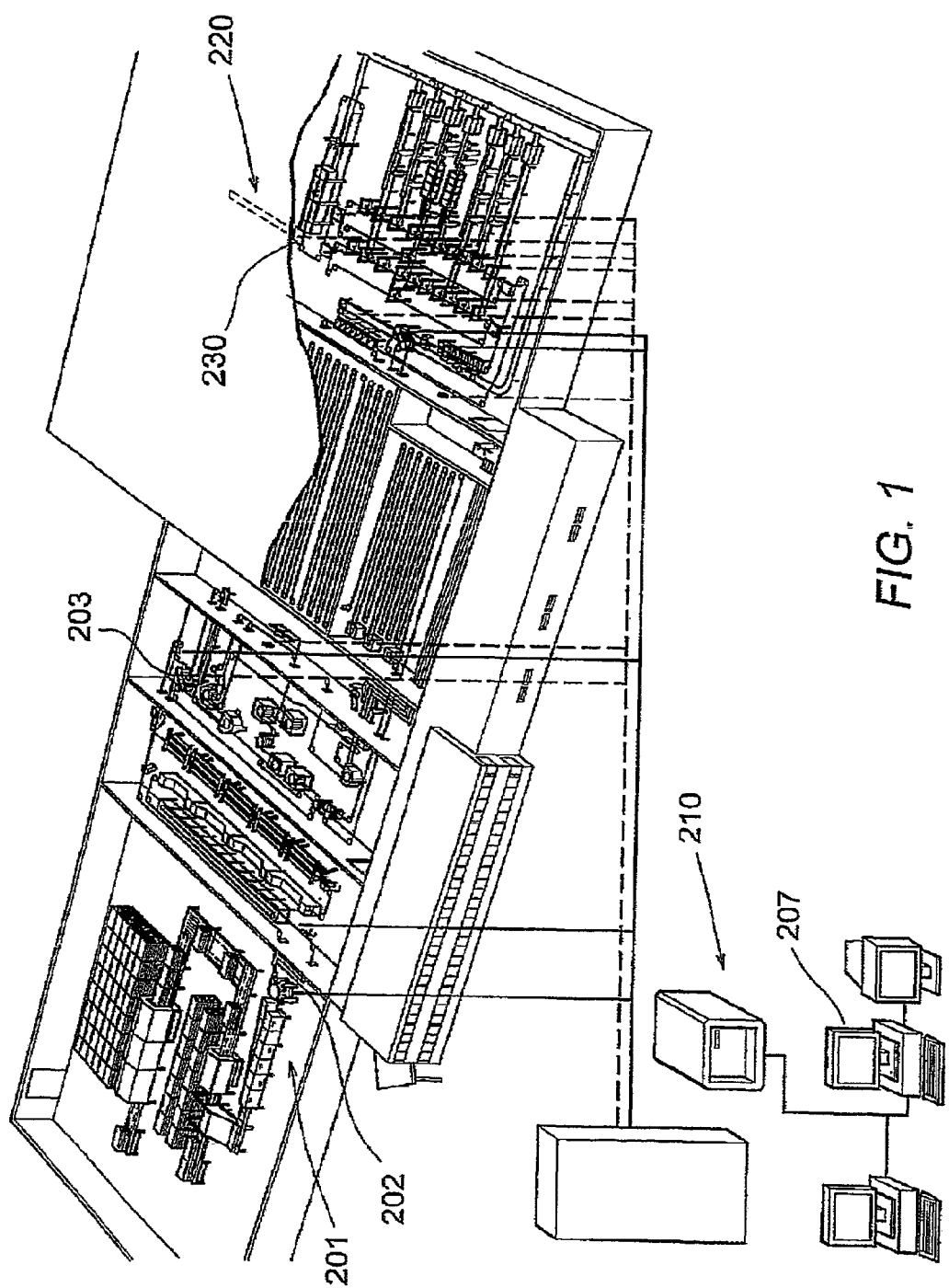

FIG. 1 diagrammatically shows a plant for slaughtering and processing poultry, where birds are supplied in crates or the like at 201 and placed in conveyor 202, a separate carrier being provided for each bird. The birds are subsequently killed and prepared so that the birds can be divided into parts.

Prior to being divided into parts, the birds pass an inspection station 203, where each bird is subjected to an inspection, preferably a visual inspection, in such a manner that, for example, a visually detectable defect on the respective product is detected.

Figure 3:
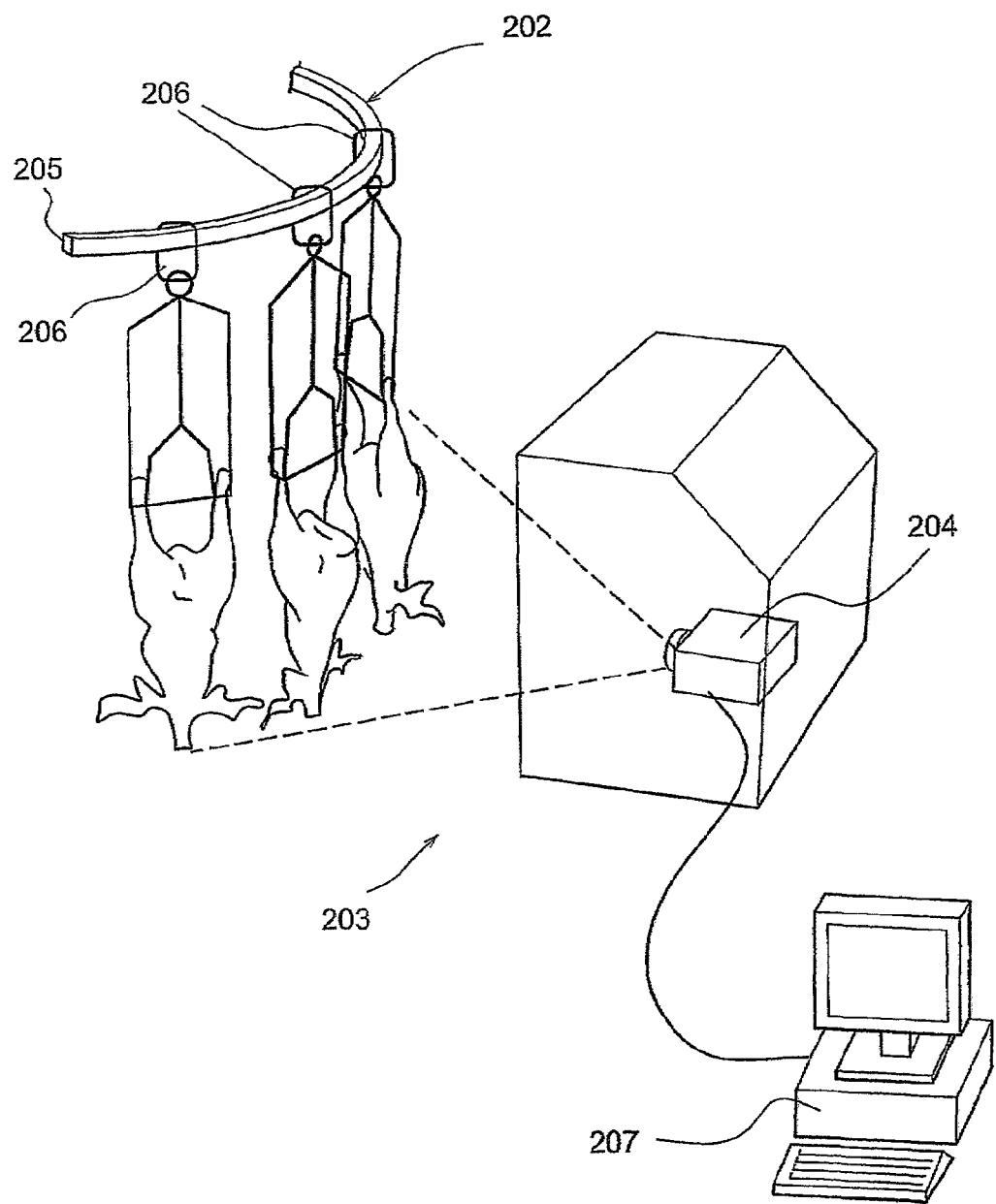
FIG. 3 shows an example of an inspection station in the slaughterhouse of FIG. 1.

FIG. 3 shows such an inspection station 203 provided with a digital camera 204 and an associated image-processing computer 207. The conveyor 202 has a guide track 205 along which the carriers 206 for each bird can be displaced. As mentioned, such a station is known per se from the prior art and already present in slaughterhouses.

Figure 4B:
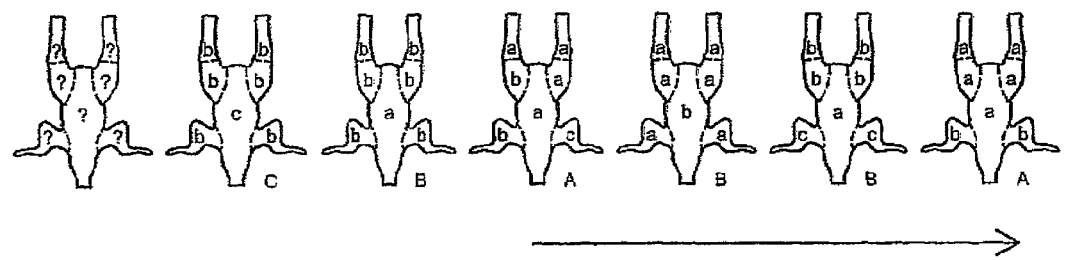

The station 203, for example, is used to detect a discolouration of the birds. As indicated in FIG. 4, there are inspection stations which are able to assign a quality grade to an entire bird (FIG. 4a), for example quality A, B or C, but there are also more complicated stations which assign a quality grade to specific parts, for example legs, wings, body, etc. (FIG. 4b).

Figure 2:
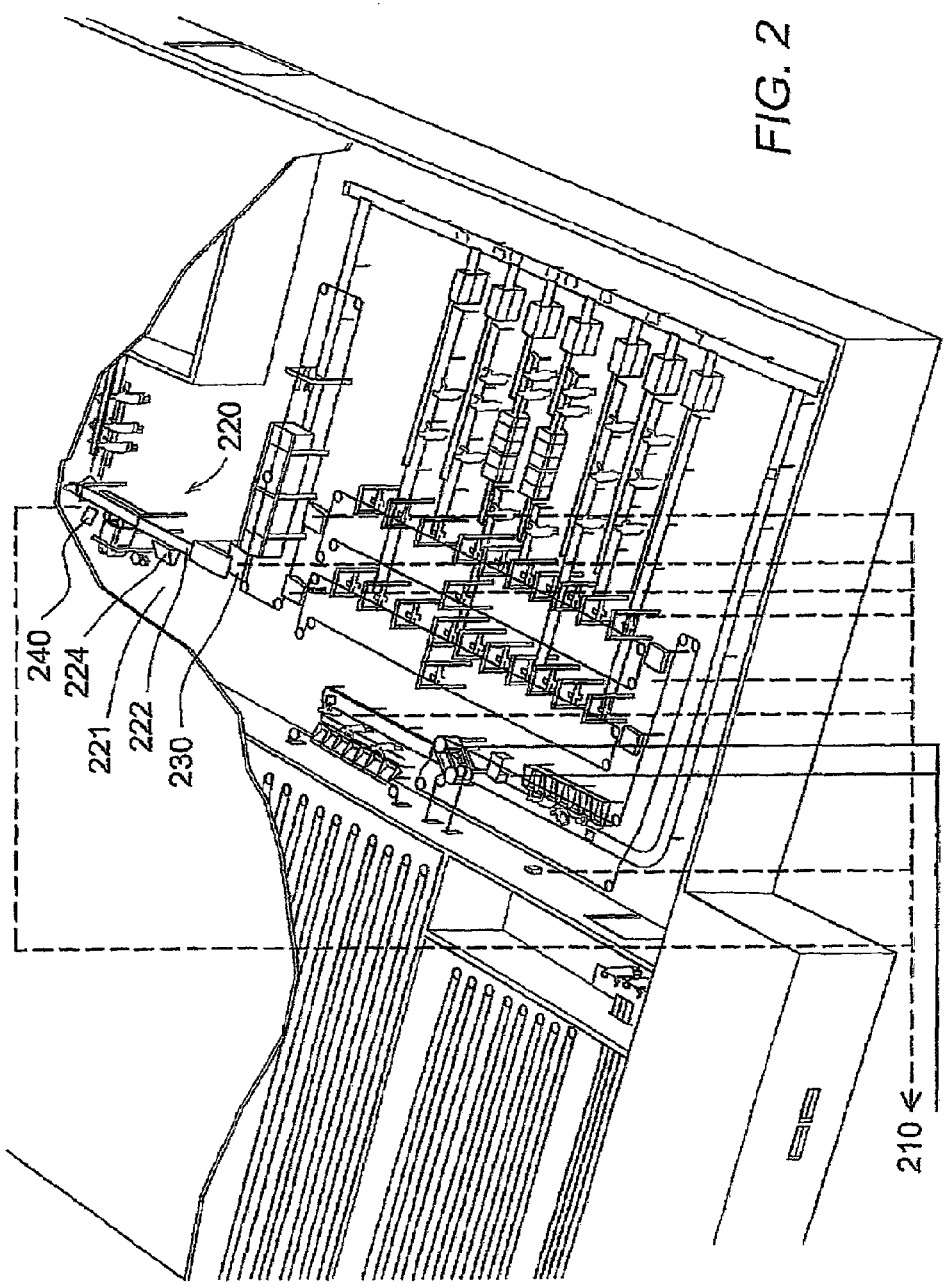
FIG. 2 shows a representation of a part of FIG. 1 on a larger scale with the additive-addition device.

The station 203 is coupled to a control and memory means 210 of the slaughterhouse, which control and memory means 210 is connected in turn to an additive-addition line 220 still to be explained (see also FIG. 2).

Based on the visual inspection in station 203, a decision is made as to whether the respective (part of a) bird is to be subjected to a specific additive-addition treatment. This may be the case, for example, if a part of a leg is found to have a discolouration.

In an embodiment which is advantageous in practice, the additive is a substance which is suitable for human consumption, for example a substance which affects the colour and/or taste, such as a marinade, for example a particulate marinade.

The additive-addition line 220 comprises one or more additive-addition stations 221, 224 and a conveyor 222 having a separate carrier for every (part of a) bird to be treated. A transfer station 230 is provided between the conveyor 222 of the additive-addition line 220 and the upstream conveyor of the slaughtering installation, so that the parts of the birds are transferred successively.

During the transfer of the parts of the birds, the memory means 210 ensure that the results of the visual inspection carried out in the inspection station 203 of every product carried by the conveyor 222 are known in order to carry out and/or optimize the additive addition.

At the additive-addition stations 221, 224, the parts of the birds are successively subjected to an additive-addition treatment and an additive is applied to at least a part of the exterior of every bird. In one variant, additive could be introduced into a part of the bird.

In one possible embodiment, a visual check is carried out in a checking station 240 after the application of additive has been completed. The station 240 is for example fitted with a digital camera and associated image-processing equipment.

The checking station 240, which in this case is also connected to the control and memory means 210, is for example set up for carrying out various visual checks, the visual check of a specific product being adapted to the previous visual inspection of the respective product prior to the application of additive. If, for example, a visually detectable defect was found at a certain location of the product during a previous visual inspection in the station 203, in particular the application of additive in said location is checked during the check in station 240.

In one possible embodiment, provision is made for the additive-addition device to be designed to carry out various additive-addition treatments, the treatment of a specific product being adapted to the previous visual inspection of the respective product. The amount of additive to be applied is, for example, variable and the amount of additive to be applied to a specific product is adapted to the previous visual inspection of the respective product.

Provision could also be made for the location for applying an additive on a product to be variable, the additive to be applied to a specific product being directed at one or more specific locations which are chosen on the basis of the previous visual inspection of the respective product.

As will become clear from the description below, provision can be made for an additive-addition station to be fitted with an addition device, which addition device dispenses additive at a distance from the product, which additive moves towards the product through the air and at least partially lands on the product. In this case, it is advantageous if additive which has not landed on the product is collected and returned to the addition device. If desired, the returned additive is subjected to a reprocessing treatment before the additive is dispensed again.

FIG. 5 diagrammatically shows a device for applying marinade to products, in particular meat products, according to the second aspect of the invention.

On the left in FIG. 5, the marinade 1 which is in a storage container 7 can be seen. The arrangement shown is designed for processing pulverulent marinade, for example mixtures of spices and fats. Marinade supply means 3 supply the marinade 1 to the heating means 5. The heating means can be designed in the form of a melting device which melts marinade supplied in a solid state. The temperature to which the marinade is to be heated has to be controlled: if the temperature is too low, solidification will occur and if the temperature is too high, segregation or the like may occur. Preferably, a solid marinade containing fat is used, which marinade melts at a temperature of approximately 55° C. and is applied at a temperature of approximately 70° C.

The marinade supply means 3 comprise dispensing means on the storage container 7, the flow rate of which is preferably adjustable. The marinade supply means 3 can also be designed such that the marinade is dispensed batchwise. The marinade supply means 3 may also comprise a sieve in order to reduce the maximum particle size of the pulverulent marinade. A possible embodiment of the marinade supply means is a marinade powder dosing device (not shown). The marinade supply means 3 also comprise one or more ducts through or along which the marinade 1 moves, such as for example tubes.

The marinade 1 is moved via a path 30 to the addition means 4. This path 30 comprises one or more ducts through or along which the marinade 1 can move, such as for example hoses. The device according to the invention is provided with further heating means 17 for heating the path 30. The path 30 includes a pump 21 for pumping the marinade 1, which pump is preferably a hose pump and is also preferably heated.

This path 30 likewise preferably includes a buffer store 18. The marinade is applied to a product 2 which is at a distance from the addition means 4.

The meat products 2, onto which marinade is applied, are moved along by means of conveying means 31. These conveying means 31 are designed such that the products 2 pass the addition means 4 separately, one behind the other, in a conveyor track 6. In this example, every product 2 is suspended from a carrier 8 which is connected to the conveyor track 6 and which are arranged at a distance from one another.

Behind the product 2, viewed in the direction of addition, there is arranged a screening wall 33 on which the marinade 1 which does not land on the product 2 is collected. Preferably, this screening wall 33 is heated. Under the products 2 and under the screening wall 33, there is a collecting unit 36 in which the marinade which does not land on the product and not on the screening wall 33 is collected, and to which the marinade 1 which has landed on the screening wall 33 flows. The marinade collected in the collecting unit 36 is returned in this example by means of a recycling device 37, in this case to the buffer store 18 or to the heating means 5. The recycling device 37 in this case comprises a sieve 35, placed in the collecting unit 36 before the marinade 1 enters the recycling device 37, in order to prevent large parts, for example parts of the meat products, blocking the device.

The device illustrated also comprises an air extraction installation 28, in this case placed near the screening wall 33 behind the product 2 onto which the marinade 1 is sprayed. Preferably, this air extraction installation 28 comprises an air purification installation with a filter for collecting marinade droplets or marinade particles. In particular, the filter is a centrifugal filter, which may optionally be heated.

FIGS. 6-8 show diagrammatic representations of variants of heating means 5. Such heating means 5 may be arranged in the position of the heating means 5 in the installation shown in FIG. 5.

The heating means in FIGS. 6 and 7 at least comprise a heated wall 9 with which the marinade 1, supplied via the marinade supply means 3, comes into contact. As a result, the marinade heats up or melts. In addition, advancing means 11 are shown which move the marinade along the heated wall 9. The advancing means 11 are driven by means of drive means 16. In FIG. 6, these advancing means 11 are designed as a rotor which is arranged between two heated walls 9. The advancing means 11 create chambers 12 containing the marinade, as a result of which the marinade is moved along and heated batchwise.

The heating means shown in FIG. 8 comprise a mixing chamber 14 in which the marinade 1, supplied by the marinade supply means 3, ends up. In addition, a heated gas is supplied to this mixing chamber 14 by means of the gas supply means 10. The marinade 1 is heated in the mixing chamber 14 and/or melted under the influence of the heated gas. If the gas is supplied under pressure, it is possible for the illustrated heating means to also form part of the addition means 4, if the addition is carried out by means of spraying. This will be addressed again later on.

In all the cases illustrated, the heated marinade 1 leaves the heating means 5 through an outlet 13 to the path 30.

FIG. 9 diagrammatically shows an exemplary embodiment of a buffer store 18, such as has been arranged in the device shown in FIG. 5. The buffer store 18 preferably comprises heating means, such as heated walls, in order to ensure that the marinade 1 heated by the heating means 5 remains warm. Furthermore, the buffer store 18 comprises an agitator 19 for keeping the marinade moving. The marinade 1 reaches the buffer store via the path 30 and also leaves the buffer store by the path 30. The buffer store comprises an outlet 20, the flow rate of which is preferably adjustable.

FIGS. 10-13 show possible embodiments of marinade-addition means 4. Such addition means may be arranged in the position of the addition means 4 in the installation shown in FIG. 5. The marinade 1 is supplied to the addition means 4 by the path 30.

In FIG. 10, the addition means 4 are injection means 22 which can inject the marinade 1 into the product 2.

In FIG. 11, the addition means 4 comprise distribution means 23 which come into contact with the product 2 and are thus able to apply the marinade 1 directly onto the product 2.

The addition means 4 shown in FIG. 12 comprise spraying means 24. These spraying means 24 comprise a spraying opening 25 having a diameter of between 1 and 15 millimeters, preferably between 5 and 10 millimeters. Such a spraying opening is also referred to as a nozzle. The diameter affects the appearance of the marinade on the product. With a sufficiently large diameter, relatively large, solid particles, for example with a size of 5 mm, can be sprayed on. The spraying opening 25 is located in a spraying head 26, which is optionally arranged to be movable. Preferably all the elements which make up the spraying means 24 are heated. The amount of marinade applied is inter alia determined by the spraying opening, the total amount is preferably between 0.5 and 4% by weight as a percentage of the product weight.

The spraying means 24 also comprise a gas supply 27 which provides a gas stream which carries the marinade 1 along to the product 2. This gas may be air. Preferably, heating means are present so as to also heat this gas stream. Mixing of the gas stream with the marinade 1 can take place in a mixing chamber 29 in front of the opening 25, in the spraying head 26, or just behind the opening 25, as illustrated in FIG. 13. A particular embodiment has already been shown in FIG. 8, in which the mixing chamber, designated there by reference numeral 14, also serves as a heating means. The heated gas stream 10 can subsequently carry the heated marinade 1 along to the product 2.

FIG. 14 shows an embodiment of the conveying means 31. In this case, the products 2 are suspended from carriers 8 which are connected to the conveyor track 6. FIG. 14 shows an embodiment of the conveying means 31 in which rotation means 15 are arranged between the carriers 8 and the conveyor track 6, as a result of which the products can rotate.

FIG. 15 shows conveying means 31 in which the products are situated on the conveyor belt 45.

FIG. 16 shows an embodiment of screening means behind the product 2 which form a screened-off space 34. This forms a more comprehensive screening off from the surroundings than the screening wall 33 shown in FIG. 5. As a result thereof, marinade mist is not able to spread in the surroundings. For the sake of clarity, the addition means 4 have not been shown in FIG. 16. Like the screening wall 33 from FIG. 5, the wall of the screened-off space 34 is preferably heated as well, so that the marinade 1 flows to a collecting unit 36 and is recycled from the latter in this case as well.

FIG. 17 shows a screen 32 between the product 2 and a part of the conveying means 31 of the products 2, in such a manner that at least a part of the conveying means 31 is screened off while the marinade 1 is being applied to the product 2.

FIG. 18 shows the device 41 according to the second aspect of the present invention as part of a production line for marinated meat products. On the right in FIG. 18 the introduction of the products 2 to be marinated can be seen. Next, the products are attached in a suspension device 38 to carriers 8 which are connected to the conveying means 31. In order to marinate an area of the meat as large as possible, it is important that the contact surface between the carrier and the product is as small as possible. FIGS. 19 and 20 show details of the suspension device 38 for the products. Alternatively, the products can be placed in a conveying installation 31 by hand. Once the product is suspended, it is optionally subjected to a preliminary treatment, such as for example dusting the product with flour. This may be effected by means of a device 39 for electrostatically adding additive particles according to the third aspect of the invention.

Next follows the device 41 according to the second aspect of the invention for spraying on heated marinade. The heating means 5, the buffer store 18 and the screened-off space 34 can be distinguished.

Thereafter follows a product release unit 40, after which the products can be packaged. The conveying means 31 are subsequently cleaned in a cleaning device 42, after which new products can be suspended from them.

FIG. 21 shows a view of the device 41 according to the second aspect of the invention. The heating means 5 to which marinade is supplied by means of the marinade supply means 3 can be seen. Behind these, the buffer store 18 is arranged, inside which the agitator 19 can be seen. In addition, the screened-off space 34 is shown, having a collecting unit (not shown), from which marinade 1 is returned to the buffer store 18 via recycling means 37 (shown).

FIG. 22 shows the same device 41 in a partially cut-away view. The heated walls 9, the advancing means 11, designed as a rotor, and the chambers 12 of the heating means 5 are shown. The buffer store 18 with the agitator 19 and outlets 20 for the marinade can also clearly be distinguished. In the embodiment illustrated, two addition means 4 have been shown, the spraying openings 25 having been placed in moveable spraying heads 26. The products 2 are suspended from carriers 8 which are attached to the conveyor track 6 by means of rotation means 15 in order in this manner to form the conveying means 31. The wall of the screened-off space 34 is visible with the collecting unit 36 and a part of the recycling device 37 underneath it.

FIG. 23 shows a sketch of a possible embodiment of an automated release device 40 for the marinated products 2, where the products are released from the carriers 8. The products may also be removed from the line by hand.

FIGS. 24 and 25 show embodiments of cleaning devices 42 for the conveying means 31. The cleaning device 42 is heated and may involve running water 43, for example in combination with brushes 44. Here, the conveying means 31 are treated in such a manner that the progress of the process is not disrupted. Marinade 1 which has landed on the conveying means 31 is removed, for example using water having a temperature above the melting temperature of the marinade.

The embodiment shown in FIG. 26 shows two additional storage containers 7' and 7". These can be used in case the components which make up the marinade are supplied separately and can only be mixed at the last moment. In this embodiment, the marinade component which is in container 7 is heated in the heating means 5. Then, the marinade is supplied to the buffer store 18 with an agitator 19, in this case designed as a cylindrical buffer store with a screw. The additional elements from the containers 7' and 7", as well as the recycled marinade may also be supplied to this buffer store. This recycled marinade is the marinade which is collected after the addition process. FIG. 26 shows how the marinade is taken to the addition means 4 along the path 30 by a pump 21. Then, the marinade is applied to the product 2 which is suspended from the carriers 8 on a conveyor track 6 using a spraying process. Marinade which does not land on the product lands on the heated wall 9 and from there drips down to the collecting unit 36, following which it moves to the buffer store 18.

The embodiment shown in FIG. 27 comprises a storage container 7, heating means 5 and an electrically heated buffer 18. In this case, the marinade 1 which has landed on the wall 9 is also able to move directly to the buffer store 18 via a collecting unit 36.

FIG. 28 shows yet another possible embodiment in order to move the marinade 1 which has landed on the wall 9 directly to the buffer store 18 via a collecting unit 36. In this embodiment, the wall 9 and the buffer store 18 are heated indirectly by water.

FIG. 29 is a diagrammatic representation of a device according to the invention for electrostatically applying additive particles to a product.

The additive particles preferably are dry, solid, small and light particles. The additive particles are, for example, dried herbs or spices, such as parsley and chives, or powders, such as paprika powder or bonding powder, or flour products, such as flour and breadcrumbs. The additive particles are illustrated in the figure by means of dots 103.

The product is a product suitable for human consumption, in particular a meat product, such as slaughtered poultry or parts thereof. Consideration may be given to chicken legs, turkey wings and the like. The products are indicated in the figure by the reference numeral 104.

The products 104 are supplied to the device according to the invention by means of conveying means 106. These conveying means 106 are designed in this case in such a manner that the products 104 pass the device according to the invention separately, one behind the other, in a conveyor track 107. To this end, the products 104 are suspended from carriers 109 which are connected to the conveyor track 107 and are at a distance from one another. Rotation means 108 are provided between the carriers 109 and the conveyor track 107, as a result of which the products can be positioned.

FIG. 29 also shows a charging electrode at a distance from the product 104. The additive particles 103 are supplied to the charging electrode 101 by the additive supply means 102. The additive supply means 102 comprise a buffer store 110 with a discharge opening 111, dosing means 112, distribution means 113 and a vibrating plate 114.

Preferably, the products are completely discharged, or they are given a known charge. Discharging can be effected by earthing the products in a suitable manner. This can be done, for example, by connecting the product to an earthed electrically conductive carrier 109. In some case, separate earthing is not necessary, since the product will only take up a limited charge. Indeed, the product may even be given a charge using means for generating an electric field 105a.

The charging electrode 101 is likewise given a charge using means for generating an electric field 105b. By ensuring that the charging electrode 101 has a charge which differs from the product 104, an electric field is created between the charging electrode 101 and the product 104.

With the device according to the invention, as illustrated in FIG. 29, the charging electrode 101 is designed as a supporting surface. In addition, the charging electrode 101 is elongated and extends along the conveyor track 107 of the products 104. The charging electrode 101 has a length such that a number of products are simultaneously opposite the charging electrode 101. This is the case because the length of the charging electrode 101 is greater than the distance between two carriers 109.

The additive particles 103 are supplied to the charging electrode 101 by additive supply means 102. The additive particles are charged on or near the charging electrode 101. When an electric field is present between the charging electrode 101 and the product 104, the additive particles 103 leave the charging electrode 101 and jump onto the product 104, to which the particles 103 will adhere. This is indicated in FIG. 29 by means of the arrows p.

The additive supply means 102 comprise a buffer store 110 for storing the additive particles. In this case, the shape of the buffer store is slightly conical and elongated, parallel to the charging electrode 101. A discharge opening 111 is provided at the bottom of the buffer store 110. The buffer store 110 has dosing means 112 for adjusting the amount of additive particles which leaves the buffer store 110. In addition, distribution means 113 have been provided in order to spread the additive particles 103. By making the buffer 110 of conical design, the additive particles 103 can leave the buffer store 110 in disperse form. Further spreading and dosing takes place by means of a vibrating plate 114 which is arranged between the discharge opening 111 of the buffer store 110 and the elongated charging electrode 101. The charging electrode 101 adjoins an edge of the vibrating plate 114, but is arranged slightly lower.

Screening means 116 are provided behind the product 104, viewed from the direction of the charging electrode 101. In addition, a collecting unit 118 is provided underneath the screening means 116 and the products 104. Both the screening means 116 and the collecting unit 118 are connected to means 119 for applying an electric field between them. When the electric field between the screening means 116 and the collecting unit 118 is sufficiently large, the additive particles 103 which have landed on the screening means 116 will jump onto the collecting unit 118. Additive particles 103 may also land in the collecting unit 118 which have landed neither on the product 104, nor on the screening means 116. The particles which have been collected in the collecting unit 118 are returned to, for example, the vibrating plate 114 or the charging electrode 101 by means of a recycling device 120. The recycling device 120 contains a sieve 121 in order to prevent excessively large parts, such as parts which have come off the product, blocking the recycling device 120 or impeding the additive-addition process.

In addition to the screening means 116 shown behind the product 104 in FIG. 29, it is also possible to take the product 104 into a completely or partially screened-off space 117, where the additive particles 103 are added, as shown in FIG. 30.

FIG. 31 shows screening means 115 between the product 104 and a part of the conveying means 107, such that a part of the carrier 109, the rotation means 108 and the conveyor track 107 are screened off while the additive particles are being applied to the product.

The device according to the invention shown in FIG. 32 comprises a buffer store 110, from which additive particles 103 are transported to a vibrating plate 114 and from there to a charging electrode 101. From the latter, the additive particles 103 jump onto the product 104, or land in the screened-off space 117. This screened-off space 117 is connected to a recycling device 120'' which can recycle additive particles back to the buffer store 110 with the aid of the pump 122.

Another possible recycling device is shown in FIG. 33, where the additive particles 103 are supplied to the product 104 by means of a known air-injection system. In this case, the product 104 is likewise situated in a screened-off space 117 which is connected to a recycling system 120''', in this case provided with a screw conveyor.

The recycling device in FIG. 34 consists of a combination of a hose 120'' and a pump 122.

The recycling device in FIG. 35 comprises a conveyor belt 120''' and a screw 120'.

FIG. 36 diagrammatically shows a device for applying additive to a product, namely a meat product, in particular a slaughtered bird or part thereof, comprising a conveyor with a guide track 300 and carriers 301 which can be displaced along the guide track, one of which carriers has been shown.

The carrier 301 is provided with projecting carrying elements 302, 303, which each have a limb 304, 305, one end of which is attached to a carrier 301 and the other end of which is designed to engage with the product.

The device furthermore comprises an additive-addition station 310 having a housing 311, which delimits an additive-addition space 312 through which the products are successively moved by means of the conveyor. The guide track 300 is arranged outside the space 312.

The housing 311 is provided with a slot 313 extending in the direction of the guide track 300, through which limbs 304, 305 of the carrying elements extend as far as into the additive-addition space 312.

As is preferable, the limbs 304, 305 jointly have a smallest cross-sectional dimension in the area where the limbs extend through the slot 313 and jointly have a larger cross-sectional dimension in the additive-addition space 312.

Furthermore, it is preferable for the limbs 304, 305 to be resilient limbs, for example made of spring steel, such that the ends engaging with the product can be moved apart counter to a spring force.

Preferably, a partial vacuum is brought about in the additive-addition space 312 with respect to the space outside the housing 311, in particular near the slot 313, so that no additive particles, which can be very small, can escape to the outside.

Figure 37B:
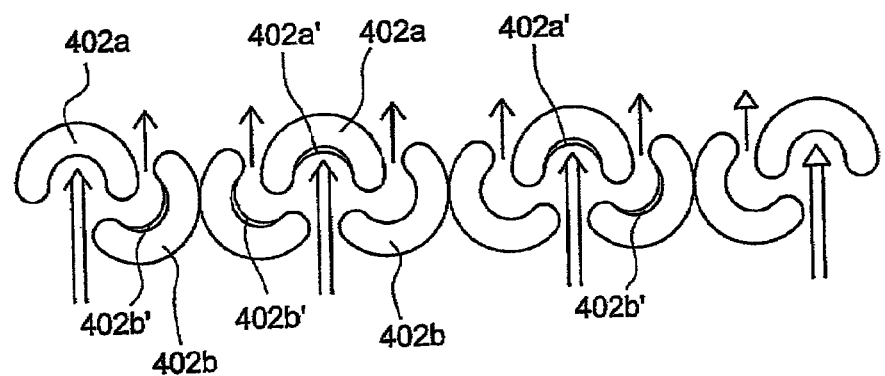

FIG. 37 diagrammatically shows a possible filter arrangement 400 which includes a preliminary filter 402 upstream of a centrifugal filter 401. The centrifugal filter 401 is shown in its folded-open position, it being possible to distinguish the lid 401a, the housing of the centrifuge motor part 401b, the rotor 401c and the housing for the rotor 401d. The preliminary filter 402 is able to separate relatively large and solid parts of the marinade from the air stream. Relatively fine droplets and particles can then be removed by the centrifugal filter. Preferably, both filters are heated, so that the marinade cannot solidify. The preliminary filter 402 is arranged at a slight angle so that the marinade collected by the preliminary filter 402 can be recycled. The action of a known preliminary filter 402 is shown in FIG. 37b: the filter consists of flattened tubes 402a and 402b which have been welded together. Air with marinade is drawn through the filter in the direction of the double arrows, the marinade accumulating in the cavities of the welded tubes, designated by 402a' and 402b'. The air, containing the fine remainders of the marinade, can be drawn further into the centrifugal filter in the direction of the single arrow. Using the preliminary filter shown, approximately 90% of the marinade can be separated from the air stream, and in particular the relatively large and solid parts thereof.

The invention claimed is:

1. A device for electrostatically applying additive particles to a meat product suitable for human consumption, comprising:

at least one charging electrode, additive supply means for supplying additive particles to the charging electrode, and means for generating an electric field between the electrode and the product, which has a charge which is different from that of the electrode, wherein at least one charging electrode is designed as a supporting surface for the additive particles, in that the additive supply means are designed for depositing the additive particles on the charging electrode, and in that the means for generating the electric field create a field such that the additive particles leave the supporting surface and jump onto the product, which is at a distance from the electrode, in which the device comprises conveying means which are designed for passing the products successively in groups or individually in a conveyor track past the charging electrode, wherein the conveying means comprise carriers which are at a distance from one another, wherein screening means are arranged in such a manner that a completely or partially screened-off space is created, which contains at least the product and the charging electrode.

2. The device according to claim 1, wherein the electrode is elongated and extends along the conveyor track.

3. The device according to claim 1, further comprising rotation means which enable the products to rotate relative to the charging electrode.

4. The device according to claim 1, wherein the charging electrode is longer than the distance between two carriers.

5. The device according to claim 1, wherein the additive supply means comprise a buffer store with discharge opening and dosing means for supplying the additive particles to the charging electrode in a dosed manner.

6. The device according to claim 1, wherein the additive supply means comprise distribution means for supplying additive particles to the charging electrode in an evenly distributed manner.

7. The device according to claim 1, wherein the charging electrode can vibrate.

8. The device according to claim 1, wherein screening means are arranged between the product and a part of the conveying means for the products, in such a manner that at least part of the conveying means is screened off while the additive particles are being applied to the product.

9. The device according to claim 1, wherein screening means are arranged behind the product, viewed from the direction of addition.

10. The device according to claim 1, wherein a collecting unit is provided under the screening means in order to collect the additives which have not been applied to the product ("overshoot").

11. The device according to claim 10, wherein the screening means and the collecting unit are made of insulating material.

12. The device according to claim 10, wherein a recycling device is arranged between the collecting unit and the charging electrode in order to recycle the excess additives collected in the collecting unit.

13. The device according to claim 11, wherein a recycling device is arranged between the collecting unit and the charging electrode in order to recycle the excess additives collected in the collecting unit.

14. The device according to claim 12, wherein the recycling device comprises sieving means in order to prevent excessively large parts from being recycled.

15. The device according to claim 1, wherein the additive particles comprise garnishing leaves or dusting products.

16. A device for electrostatically applying additive particles to a meat product suitable for human consumption, comprising:
at least one charging electrode, additive supply means for supplying additive particles to the charging electrode, and means for generating an electric field between the electrode and the product, which has a charge which is different from that of the electrode, wherein at least one charging electrode is designed as a supporting surface for the additive particles, in that the additive supply means are designed for depositing the additive particles on the charging electrode, and in that the means for generating the electric field create a field such that the additive particles leave the supporting surface and jump onto the product, which is at a distance from the electrode, in which the device comprises conveying means which are designed for passing the products successively in groups or individually in a conveyor track past the charging electrode, wherein the conveying means comprise carriers which are at a distance from one another,
wherein the additive supply means comprise a buffer store with discharge opening and dosing means for supplying the additive particles to the charging electrode in a dosed manner, and in which the additive supply means comprise distribution means for supplying additive particles to the charging electrode in an evenly distributed manner, in which a vibrating plate is arranged between the discharge opening and the charging electrode.

17. The device according to claim 16, wherein the charging electrode adjoins an edge of the vibrating plate.

18. The device according to claim 17, wherein the electrode is arranged lower than the vibrating plate.

19. A device for electrostatically applying additive particles to a meat product suitable for human consumption, comprising:
at least one charging electrode, additive supply means for supplying additive particles to the charging electrode, and means for generating an electric field between the electrode and the product, which has a charge which is different from that of the electrode, wherein at least one charging electrode is designed as a supporting surface for the additive particles, in that the additive supply means are designed for depositing the additive particles on the charging electrode, and in that the means for generating the electric field create a field such that the additive particles leave the supporting surface and jump onto the product, which is at a distance from the electrode, in which the device comprises conveying means which are designed for passing the products successively in groups or individually in a conveyor track past the charging electrode, wherein the conveying means comprise carriers which are at a distance from one another,
wherein the device is provided with an air-extraction installation.

20. The device according to claim 19, wherein the air-extraction installation is provided with separating means in order to separate air and particles.

* * * * *